US009590874B2

(12) United States Patent
Abraham et al.

(10) Patent No.: US 9,590,874 B2
(45) Date of Patent: Mar. 7, 2017

(54) SYSTEM AND METHOD OF INFRASTRUCTURE SERVICE DISCOVERY

(71) Applicant: QUALCOMM INCORPORATED, San Diego, CA (US)

(72) Inventors: Santosh Paul Abraham, San Diego, CA (US); George Cherian, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 137 days.

(21) Appl. No.: 14/452,318

(22) Filed: Aug. 5, 2014

(65) Prior Publication Data

US 2014/0351435 A1 Nov. 27, 2014

Related U.S. Application Data

(62) Division of application No. 13/658,238, filed on Oct. 23, 2012, now Pat. No. 8,867,514.

(60) Provisional application No. 61/613,426, filed on Mar. 20, 2012.

(51) Int. Cl.

| | |
|---|---|
| ***H04W 4/00*** | (2009.01) |
| ***H04L 12/24*** | (2006.01) |
| ***H04W 48/16*** | (2009.01) |
| ***H04W 80/02*** | (2009.01) |
| ***H04L 29/08*** | (2006.01) |
| *H04W 80/04* | (2009.01) |

(52) U.S. Cl.

CPC .......... *H04L 41/5058* (2013.01); *H04L 67/16* (2013.01); *H04W 48/16* (2013.01); *H04W 80/02* (2013.01); *H04W 80/04* (2013.01)

(58) Field of Classification Search

CPC combination set(s) only.
See application file for complete search history.

(56) References Cited

U.S. PATENT DOCUMENTS

| | | | |
|---|---|---|---|
| 7,804,807 | B2 | 9/2010 | Korus et al. |
| 8,467,359 | B2 | 6/2013 | McCann et al. |
| 8,621,201 | B2 | 12/2013 | Costa et al. |
| 2007/0174381 | A1 | 7/2007 | Kitamura |
| 2009/0319663 | A1 | 12/2009 | Giles et al. |
| 2011/0151840 | A1 | 6/2011 | Gong et al. |
| 2011/0216753 | A1 | 9/2011 | Kneckt et al. |
| 2012/0023243 | A1 | 1/2012 | Xu |
| 2012/0054106 | A1 | 3/2012 | Stephenson et al. |
| 2012/0076118 | A1 | 3/2012 | Montemurro et al. |
| 2012/0155350 | A1 | 6/2012 | Wentink et al. |

(Continued)

FOREIGN PATENT DOCUMENTS

WO 2010052523 A1 5/2010

OTHER PUBLICATIONS

International Search Report and Written Opinion—PCT/US2013/031333—ISA/EPO—Nov. 8, 2013.

(Continued)

*Primary Examiner* — Frank Duong
(74) *Attorney, Agent, or Firm* — Joseph Hanasz

(57) ABSTRACT

A system and method of infrastructure service discovery is disclosed. In a particular embodiment, a method includes requesting, from an access point, association without authentication and a restricted Internet protocol (IP) address, wherein the restricted IP address is restricted for use in a service discovery procedure.

20 Claims, 14 Drawing Sheets

1000
1002 MOBILE STATION
1004 ACCESS POINT
Determine Whether An Access Point Issues An IP Address Reserved For Service Discovery Messages
1006 Indication of Access Point Capabilities
1008 Request Association Without Authentication And Request Issuance Of A Restricted Internet Protocol (IP) Address That Is Restricted For Use In A Service Discovery Procedure
Determine A Number Of Association Requests
1010 Association Response Including The Restricted Internet Protocol Address
1012 Transfer Service Discovery Messages
Filter Received Data Packets
1014 Request Association For IP Connectivity
1016 Authenticate and Transfer Data
TIME
TIME

(56) References Cited

U.S. PATENT DOCUMENTS

| | | | | |
|---|---|---|---|---|
| 2013/0176897 | A1* | 7/2013 | Wang | H04W 12/06 370/254 |
| 2013/0230036 | A1 | 9/2013 | Reznik et al. | |
| 2013/0250803 | A1 | 9/2013 | Abraham et al. | |
| 2014/0122242 | A1* | 5/2014 | Stephenson | G06Q 30/0267 705/14.64 |
| 2014/0348025 | A1 | 11/2014 | Abraham et al. | |
| 2015/0189577 | A1* | 7/2015 | Kim | H04W 48/14 370/338 |

OTHER PUBLICATIONS

Partial International Search Report—PCT/US2013/031333—ISA/EPO—Sep. 10, 2013.
IEEE Draft P802.1 X/D11, Standard for Port based Network Access Control, IEEE, Mar. 27, 2001, 147 pages.

* cited by examiner

SYSTEM AND METHOD OF INFRASTRUCTURE SERVICE DISCOVERY

I. CROSS REFERENCE TO RELATED APPLICATIONS

The present application is a divisional application of, and claims priority to, U.S. patent application Ser. No. 13/658,238 filed Oct. 23, 2012, which claims priority from U.S. Provisional Application No. 61/613,426 filed Mar. 30, 2012, the contents of which are expressly incorporated herein by reference in their entirety.

II. FIELD

The present disclosure is generally related to constructing, formatting, and communicating infrastructure service discovery messages.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

Wireless communication systems support discovery of services by mobile devices that are fully authenticated and/or associated with an access point (e.g., devices that performed a handshake procedure and/or exchanged credentials). When a mobile device is not fully authenticated and/or associated with the access point, the mobile device communicates service discovery messages using layer 2 protocols. When the mobile device is fully authenticated and/or associated, the mobile device communicates service discovery messages using layer 3 protocols (e.g., service discovery protocols such as Bonjour, universal Plug and Play (uPnP), and zero-conf based protocols). The use of layer 3 protocols for service discovery may be preferable to the use of layer 2 protocols, because the layer 3 protocols enable more detailed queries and responses. However, using the layer 3 protocols generally requires an authentication and allocation process which is time-consuming and involves exchanging numerous messages.

IV. SUMMARY

A wireless communication system may support discovery of services by one or more mobile devices (e.g., mobile stations) using layer 3 protocols when the one or more mobile devices are not fully authenticated and/or associated with an access point. The systems described herein enable a mobile station to use layer 3 protocols for service discovery before the mobile station is fully authenticated and/or assigned an IP address.

As used herein, the term "layer N" may refer to an Nth layer of the Open Systems Interconnection (OSI) model, in which layers 1-7 may alternately be referred to as a physical layer, a data link layer, a network layer, a transport layer, a session layer, a presentation layer, and an application layer, respectively.

In a particular embodiment, a method includes generating, at a mobile station, a layer 2 protocol query and generating a layer 3 protocol query associated with a service discovery request and encapsulating at least a portion of a layer 3 protocol query associated with a service discovery request in the layer 2 protocol query to generate a modified layer 2 protocol query. The method also includes sending the modified layer 2 protocol query to one of an access point and an information server via a wireless network.

In another particular embodiment, an apparatus includes a processor and a memory coupled to the processor. The memory stores instructions executable by the processor to encapsulate at least a portion of a layer 3 protocol query in a layer 2 protocol query to generate a modified layer 2 protocol query. The layer 3 protocol query is associated with a service discovery request. The apparatus further includes a transceiver configured to send the modified layer 2 protocol query to one of an access point and a generic advertisement service (GAS) server via a wireless network.

In another particular embodiment, an apparatus includes means for generating a data link layer query. The apparatus also includes means for encapsulating at least a portion of a network layer query in the data link layer query to generate a modified data link layer query. The network layer query associated with a service discovery request. The apparatus further includes means for sending the modified data link layer query via a wireless network.

In another particular embodiment, a non-transitory processor-readable medium includes instructions that, when executed by a processor, cause the processor to encapsulate at least a portion of a network layer query in the data link layer query to generate a modified data link layer query. The network layer query is associated with a service discovery request. The non-transitory processor-readable medium further includes instructions that, when executed by the processor, cause the processor to send the modified data link layer query via a wireless network.

In another particular embodiment, a method includes extracting, at an access point from a layer 2 protocol query, at least a portion of a layer 3 protocol query encapsulated in the layer 2 protocol query. The layer 3 protocol query is associated with a service discovery request. The method further includes encapsulating at least a portion of a layer 3 protocol response in a layer 2 protocol response to generate a modified layer 2 protocol response. The layer 3 protocol response is communicated in response to the portion of the layer 3 protocol query.

In another particular embodiment, an apparatus includes a processor and a memory coupled to the processor. The memory stores instructions executable by the processor to extract from a layer 2 protocol query at least a portion of a layer 3 protocol query included in the layer 2 protocol query. The layer 3 protocol query is associated with a service discovery request. The instructions are further executable by the processor to encapsulate at least a portion of a layer 3 protocol response in a layer 2 protocol response to generate a modified layer 2 protocol response. The layer 3 protocol response is communicated in response to the portion of the layer 3 protocol query.

In another particular embodiment, an apparatus includes means for extracting at least a portion of a network layer query included in a data link layer query from the data link layer query. The network layer query is associated with a service discovery request. The apparatus also includes means for encapsulating at least a portion of a network layer response in a data link layer response to generate a modified data link layer response. The network layer response is responsive to the portion of the network layer query.

In another particular embodiment, a non-transitory processor-readable medium includes instructions that, when executed by a processor, cause the processor to extract from a data link layer query at least a portion of a network layer query included in the data link layer query. The network layer query is associated with a service discovery request. The non-transitory processor-readable medium further includes instructions that, when executed by the processor, cause the processor to encapsulate at least a portion of a network layer response in a data link layer response to generate a modified data link layer response. The network layer response is responsive to the portion of the network layer query.

In another particular embodiment, a method includes generating a service query message at a mobile station. The method also includes sending the service query message to an advertisement server via an uncontrolled port.

In another particular embodiment, an apparatus includes a processor and a memory coupled to the processor. The memory stores instructions executable by the processor to generate a service query message and to send the service query message to an advertisement server via an uncontrolled port.

In another particular embodiment, an apparatus includes means for generating a service query message. The apparatus also includes means for sending the service query message to an advertisement server via an uncontrolled port.

In another particular embodiment, a non-transitory processor-readable medium includes instructions that, when executed by a processor, cause the processor to generate a service query message. The non-transitory processor-readable medium further includes instructions that, when executed by the processor, cause the processor to send the service query message to an advertisement server via an uncontrolled port.

In another particular embodiment, a method includes routing, at an access point, a service query message to an advertisement server via an uncontrolled port. In another particular embodiment, an apparatus includes a processor and a memory coupled to the processor. The memory stores instructions executable by the processor to route a service query message to an advertisement server via an uncontrolled port.

In another particular embodiment, an apparatus includes means for receiving, at an access point, a service query message. The apparatus also includes means for routing the service query message to an advertisement server via an uncontrolled port.

In another particular embodiment, a non-transitory processor-readable medium includes instructions that, when executed by a processor, cause the processor to route the service query message to an advertisement server via an uncontrolled port.

In another particular embodiment, a method includes requesting an access point to issue an Internet protocol address reserved for service discovery messages. In another particular embodiment, an apparatus includes a processor and a memory coupled to the processor. The memory stores instructions executable by the processor to request an Internet protocol address reserved for service discovery messages.

In another particular embodiment, an apparatus includes means for requesting, from an access point, association without authentication and a restricted Internet protocol (IP) address. The restricted IP address is restricted for use in a service discovery procedure. The apparatus also includes means for receiving, at a mobile station, the restricted IP address.

In another particular embodiment, a non-transitory processor-readable medium includes instructions that, when executed by a processor, cause the processor to request, from an access point, association without authentication and a restricted Internet protocol address. The restricted Internet protocol address is restricted for use in a service discovery procedure.

In another particular embodiment, a method includes receiving, from a mobile station, a request for association without authentication and for a restricted Internet protocol (IP) address that is restricted for use in a service discovery procedure. In another particular embodiment, an apparatus includes a processor and a memory coupled to the processor. The memory stores instructions executable by the processor to receive a request for association without authentication and for a restricted Internet protocol (IP) address that is restricted for use in a service discovery procedure.

In another particular embodiment, an apparatus includes means for maintaining a list at a memory. The list includes a restricted Internet protocol (IP) address that is restricted for use in a service discovery procedure. The apparatus also includes means for receiving a request for association without authentication and for the restricted IP address.

In another particular embodiment, a non-transitory processor-readable medium includes instructions that, when executed by a processor, cause the processor to receive a request for association without authentication and for a restricted Internet protocol (IP) address that is restricted for use in a service discovery procedure.

One particular advantage provided by at least one of the disclosed embodiments is that a mobile station may use layer 3 protocols for service discovery before the mobile station is fully authenticated and/or assigned an IP address.

Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular embodiments of the present disclosure are described below with reference to the drawings. In the description, common features are designated by common reference numbers throughout the drawings.

Figure 1:
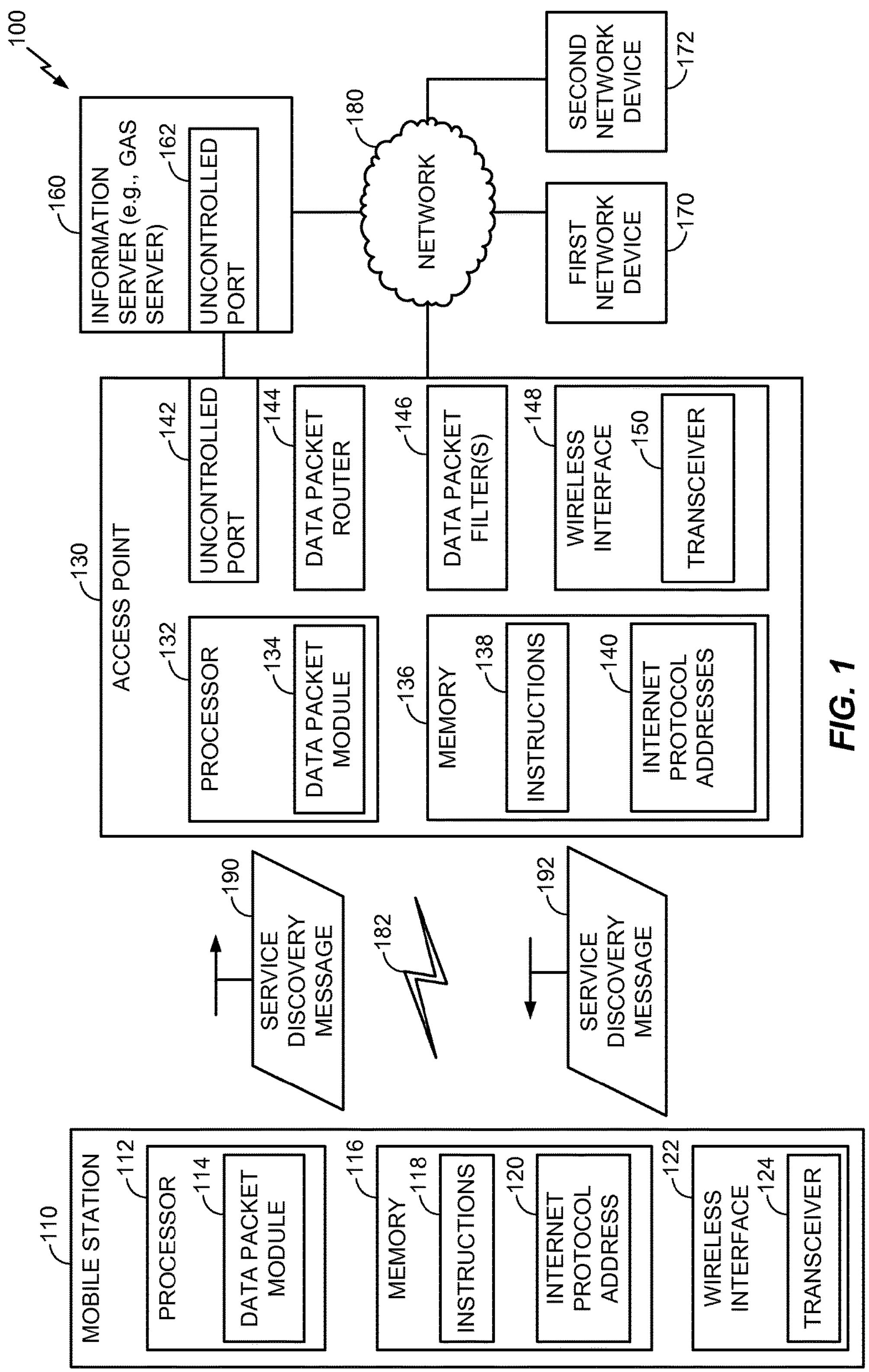
FIG. 1 is a diagram of a particular embodiment of a system that is operable to communicate service discovery messages to and from a mobile station.

Referring to FIG. 1, a particular illustrative embodiment of a system 100 is shown. The system 100 may be configured to construct, format, and/or communicate infrastructure service discovery messages (e.g., service discovery messages). The system 100 may include at least one mobile station 110, an access point 130, an information server 160, and one or more network devices, such as a first network device 170 and a second network device 172.

The mobile station 110 may be coupled to the access point 130 via a wireless connection, a wired connection, or a combination thereof. The access point 130 may be coupled to the information server 160, the first network device 170, and the second network device 172 via a network 180. The network 180 may be a wired network, a wireless network, or a combination thereof. The access point 130 may also be directly coupled to one or more of the information server 160, the first network device 170, and the second network device 172. For example, the access point 130 may be directly coupled to the information server 160. Accordingly, the mobile station 110 may communicate with the information server 160, the first network device 170, and the second network device 172 via the access point 130. In an alternative embodiment, the mobile station 110 may be wirelessly coupled to the information server 160 and may communicate directly with the information server 160 via a wireless communication path 182.

The mobile station 110 may transmit a service discovery message 190 via the wireless communication path 182 to the access point 130. The access point 130 may receive the service discovery message 190 and route the service discovery message 190 to one or more of the information server 160, the first network device 170, and the second network device 172. In response to the service discovery message 190, the access point 130 may generate a response, such as a service discovery message 192, and may transmit the response to the mobile station 110 via the wireless communication path 182. Additionally, one or more of the information server 160, the first network device 170, and the second network device 172 may generate a response that is sent to the mobile station 110 via the access point 130.

The mobile station 110 may include a processor 112, a memory 116, and a wireless interface 122. The processor 112 may include or implement a data packet module 114. The memory 116 may store instructions 118 and an Internet protocol (IP) address 120. The wireless interface 122 may include a transceiver 124. The processor 112 may be coupled to the memory 116 and to the wireless interface 122. For example, the processor 112 may access and execute the instructions 118 to perform one or more operations, such as the service discovery operations described herein. As another example, the processor 112 may access and provide the Internet protocol address 120 to the data packet module 114. The processor 112 may also be coupled to the transceiver 124 to enable the mobile station 110 to wirelessly transmit, via the transceiver 124, data packets generated by the data packet module 114.

The data packet module 114 may generate one or more data packets to be transmitted via the wireless communication path 182. For example, the data packet module 114 may generate a data packet to be included in the service discovery message 190. The data packet module 114 may generate the data packet in accordance with one or more protocols. For example, the data packet module 114 may generate the data packet based on one or more embodiments as described herein with reference to FIGS. 2-14. The data packet module 114 may also process one or more data packets received at the mobile station 110 via the wireless communication path 182. For example, the data packet module 114 may receive the service discovery message 192 via the wireless interface 122 and may deconstruct (e.g., parse and/or extract) a payload of the service discovery message 192.

The instructions 118 may include operational instructions associated with the mobile station 110, such as processor-executable instructions to control operation of one or more modules of the processor 112 (e.g., the data packet module 114). The memory 116 may store the Internet protocol address 120 to be used during wireless communication, where the Internet protocol address 120 is received from the access point 130 and operates to identify the mobile station 110 as a source of the service discovery message 190 and as a destination of the service discovery message 192. The wireless interface 122 may be configured to transmit the service discovery message 190 and receive the service discovery message 192 via the wireless transceiver 124. The transceiver 124 may include a single transceiver or multiple transceivers.

The access point 130 may include a processor 132, a memory 136, an uncontrolled port 142, a data packet router 144, a data packet filter 146, and a wireless interface 148. The access point 130 may also include one or more controlled ports (not shown in FIG. 1). The processor 132 may include or implement a data packet module 134. The memory 136 may store instructions 138 and Internet protocol addresses 140. The wireless interface 148 may include a transceiver 150.

The processor 132 may be coupled to the memory 136, the uncontrolled port 142, the data packet router 144, the data packet filter 146, and the wireless interface 148. For example, the processor 132 may access and execute the instructions 138 to perform one or more operations, such as service discovery operations described herein. In a particular embodiment, the memory 136 includes a cache memory. As another example, the processor 132 may access and provide the Internet protocol addresses 140 to the data packet module 134. The processor 132 may also be coupled to the wireless interface 148 to enable the access point 130 to wirelessly transmit, via the transceiver 150, data packets generated by the data packet module 134.

The data packet module 134 of the access point 130 may generate one or more data packets to be transmitted via the wireless communication path 182, via the network 180, via the uncontrolled port 142, or any combination thereof. For example, the data packet module 134 may generate a data packet to be included in the service discovery message 192. The data packet module 134 may generate the data packet in accordance with one or more protocols. For example, the data packet 134 may generate the data packet based on one or more embodiments as described herein with reference to FIGS. 2-14. The data packet module 134 may also process one or more data packets received at the access point 130 from one of the mobile station 110, the information server 160, the first network device 170, and the second network device 172. For example, the data packet module 134 may receive the service discovery message 190 via the wireless interface 148 and may deconstruct (e.g., parse and/or extract) a payload of the service discovery message 190.

The instructions 138 may include operational instructions associated with the access point 130, such as processor-executable instructions to control operation of one or more modules of the processor 132 (e.g., the data packet module 134). The memory 136 may store the Internet protocol addresses 140, where the Internet protocol addresses 140 are issued to one or more mobile stations, such as the exemplary mobile station 110, after an association process or an authentication process (e.g., a handshake).

The access point 130 may maintain the Internet protocol addresses 140 as a list of Internet protocol addresses. Each entry in the list of Internet protocol addresses 140 may include a timestamp corresponding to a time when the corresponding Internet protocol address 140 was issued to a particular mobile station. A particular Internet protocol address may operate to identify a particular mobile station when sending or receiving service discovery messages to and from the access point 130. The Internet protocol addresses 140 may include at least two subsets of Internet protocol addresses, such as a first subset of Internet protocol address for issuance after an authentication procedure and a second subset of restricted Internet protocol addresses that are restricted (e.g., reserved) for use in a service discovery procedure (e.g., issued without an authentication procedure). Accordingly, the access point 130 may filter (and route), using the data packet filter 146, received data packets based on whether the data packet includes an Internet protocol address from the first subset of Internet protocol addresses or from the second subset of Internet protocol addresses. Particular embodiments of routing packets based on a source Internet protocol address are further described with reference to FIGS. 9-12.

The data packet filter 146 may include a data link layer filter (e.g., a layer 2 protocol filter) and a network layer filter (e.g., a layer 3 protocol filter). As used herein, the term "layer N" may refer to an Nth layer of the Open Systems Interconnection (OSI) model, in which layers 1-7 may alternately be referred to as a physical layer, a data link layer, a network layer, a transport layer, a session layer, a presentation layer, and an application layer, respectively. The data link layer filter may receive a data packet including a service discovery message and may determine (e.g., based on a source media access control (MAC) address of the data packet) whether the data packet is from a source device that was previously allocated a restricted Internet protocol address that is restricted for use in a service discovery procedure (e.g., an Internet protocol address from the second subset of the Internet protocol addresses 140), and whether such an address is valid. If so, the data link layer filter may pass the data packet to the network layer filter.

The network layer filter may determine whether the data packet passed through by the data link layer filter includes a service discovery message. When the network layer filter determines that the data packet includes the service discovery message, the network layer filter may pass the data packet to a network layer of the access point 130 to be processed in accordance with a network layer protocol (e.g., a layer 3 protocol) or a higher layer protocol. In a particular embodiment, the data link layer filter includes a media access control (MAC) address filter and the network layer filter includes or is implemented using a service discovery service access point (SAP).

In a particular embodiment, the data packet router 144 may be coupled to the uncontrolled port 142. The data packet router 144 may include a switch (not shown in FIG. 1) coupled to the processor 132 and configured to route a received data packet to the uncontrolled port 142. The data packet router 144 may route a received data packet via an uncontrolled port 162 of the information server 160 when the received data packet is formatted based on a service discovery protocol, as further described herein with reference to FIGS. 5-8.

The information server 160 may be coupled to the access point 130 via the network 180 or may be directly coupled to the access point 130, as shown in FIG. 1. The information server 160 may be configured to provide information associated with one or more services, devices, or a combination thereof, that are accessible via a network, such as the network 180. In a particular embodiment, the information server 160 includes a generic advertisement service (GAS) server. The uncontrolled port 162 of the information server 160 may be coupled to the uncontrolled port 142 of the access point 130. In a particular embodiment, the uncontrolled port 162 of the information server 160 is in compliance with an Institute of Electrical and Electronics Engineers (IEEE) 801.1X standard. The information server 160 may maintain information for services provided by one or more network devices, such as the network devices 170 and 172. The information maintained at the information server 160 for a particular service may include a media access control (MAC) address of the device that provides (and optionally advertises) the particular service, an Internet protocol (IP) address of the device, a device name of the device, a service name of the particular service, a service type of the particular service, or any combination thereof. In a particular embodiment, the information server 160 may monitor service discovery messages that are transmitted via the network 180.

Thus, the information server 160, the first network device 170, and the second network device 172 may include or implement one or more services that are accessible to the mobile station 110. For example, the information server 160, the first network device 170, or the second network device 172 may include or implement a media service, a print service, a financial service, a music service, a video service, or a combination thereof. In a particular embodiment, the first network device 170 or the second network device 172 includes an advertisement server.

During operation, the system 100 may support discovery of services by mobile devices (e.g., the mobile station 110) that are not fully authenticated and/or associated with the access point 130. In existing systems, devices may not be able to communicate using layer 3 protocols (e.g., service discovery protocols such as Bonjour, universal Plug and Play (uPnP), and zero-conf based protocols) until after being authenticated and being allocated a layer 3 identifier (e.g., an IP address). This authentication and allocation process may be time-consuming and may involve exchanging numerous messages. Thus, in existing systems, devices that are not fully authenticated and/or associated may be limited to using layer 2 protocols for service discovery. However, the use of layer 3 protocols for service discovery may be preferable to the use of layer 2 protocols, because the layer 3 protocols may enable more detailed queries and responses. The system 100 of FIG. 1 may enable the mobile station 110 to use layer 3 protocols for service discovery before the mobile station 110 is fully authenticated and/or assigned an IP address. Three such examples of operation of the system 100 are described below.

During a first exemplary operation of the system 100, service discovery may be performed by encapsulating at least a portion of a higher layer protocol message in a lower layer protocol message. In a particular embodiment, an entirety of the higher layer protocol message is encapsulated in the lower layer protocol message. For example, the mobile station 110 may determine whether the access point 130 is generic advertisement service (GAS) protocol compliant. When the mobile station 110 determines the access point 130 is GAS protocol compliant, the data packet module 114 may generate a layer 3 protocol (e.g., a network layer protocol) query associated with a service discovery request. The processor 112 may encapsulate at least a portion of the layer 3 protocol query in a layer 2 protocol (e.g., a data link layer protocol) query to generate a modified layer 2 protocol query. In a particular embodiment, the processor 112 extracts the portion of the layer 3 protocol query from the layer 3 protocol query. Additionally, the processor 112 may select one or more fields of the layer 3 protocol query to be extracted. In a particular embodiment, the data packet module 114 may generate a first layer 3 protocol query using a first protocol and generate a second layer 3 protocol query using a second protocol. The processor 112 may encapsulate both at least a portion of the first layer 3 protocol query and at least a portion of the second layer 3 protocol query in the layer 2 protocol query. In a particular embodiment, the layer 2 protocol is the GAS protocol and the layer 2 protocol query includes a GAS protocol request. In another particular embodiment, the layer 2 protocol query corresponds to a media access control (MAC) address layer and the layer 3 protocol query corresponds to an Internet protocol layer (and/or a higher layer than the Internet protocol layer).

The mobile station 110 may send the modified layer 2 protocol query to the access point 130 via the transceiver 124. In an alternative embodiment, the mobile station 110 may determine whether an advertisement server is GAS protocol compliant and may send the modified layer 2 protocol query to the advertisement server via the transceiver 124.

The access point 130 may receive the modified layer 2 protocol query via the transceiver 150. The data packet module 134 may extract the portion of the layer 3 protocol query included in the modified layer 2 protocol query. The access point 130 may forward the portion of the layer 3 protocol query to one or more of the information server 160, the first network device 170, and the second network device 172 using a unicast transmission or a multicast transmission.

The access point 130 may receive a layer 3 protocol response from one or more of the information server 160, the first network device 170, and the second network device 172. The layer 3 protocol response may be responsive to the portion of the layer 3 protocol query. The access point 130 may store the portion of the layer 3 protocol response in the memory 136. In a particular embodiment, the access point 130 stores an entirety of the layer 3 protocol response in a memory, such as the memory 136. The processor 132 of the access point 130 may encapsulate the portion of the layer 3 protocol response in a layer 2 protocol response to generate a modified layer 2 protocol response using the data packet module 134. In a particular embodiment, the access point 130 receives at least a portion of two or more layer 3 protocol responses from a plurality of network devices. The processor 132 may consolidate the portions of the two or more layer 3 protocol responses prior to encapsulation into the layer 2 response. The access point 130 may transmit the modified layer 2 protocol response to the mobile station 110.

The transceiver 124 of the mobile station 110 may receive the modified layer 2 protocol response from the access point 130. The processor 112 of the mobile station 110 may extract the portion(s) of the layer 3 response(s) from the modified layer 2 protocol response using the data packet module 114. Subsequent to receiving the modified layer 2 protocol response, the mobile station 110 may determine whether or not to initiate an association procedure with the access point 130 based on the extracted portion of the layer 3 response. Accordingly, the mobile station 110 may establish Internet protocol (IP) connectivity with the access point 130 after completion of the association procedure.

During a second exemplary operation of the system 100, service discovery may be performed by using one or more uncontrolled ports. For example, the mobile station 110 may generate a service query message and may encapsulate the service query message in a portion of a data frame (e.g., a data packet) using the data packet module 114. The mobile station 110 may send the data frame to an advertisement server via an uncontrolled port, such as the uncontrolled port 142 of the access point 130. For example, the mobile station 110 may send the data frame including the service query message to the access point 130 so that the access point 130 routes the service query message to the advertisement server (e.g., the information server 160, the first network device 170, or the second network device 172). In a particular embodiment, the uncontrolled port 142 of the access point 130 is in compliance with an IEEE 801.1X standard.

The access point 130 may receive the data frame, via the transceiver 150, and determine whether the data frame includes the service query message. The access point 130 may operate a switch of the data packet router 144 to route the service query message to the advertisement server via the uncontrolled port 142. In a particular embodiment, the data frame includes a type-length-value (TLV) element. The TLV element may include the service query message, and the access point 130 may extract the service query message from the TLV element. The access point 130 may forward the extracted service query message to the advertisement server (e.g., the information server 160).

The access point 130 may receive a response that is responsive to the service query message and may send the response to the mobile station 110. The mobile station 110 may receive the response to the service query message via the transceiver 124. In a particular embodiment, the response received at the mobile station 110 includes an extensible authentication protocol over local area network (EAPOL) protocol data unit (PDU). The EAPOL PDU may include a type-length-value (TLV) element having the response included in the TLV element. The mobile station 110 may parse the TLV element from the EAPOL PDU using the data packet module 114 and may extract the response from the parsed TLV element.

Subsequent to receiving the response, the mobile station 110 may generate an authentication request. The mobile station 110 may send the authentication request to the access point 130 to initiate an association procedure with an access point 130 to establish Internet protocol (IP) connectivity with the access point 130. The authentication request may include one or more credentials associated with the mobile station 110. The access point 130 may receive the authentication request from a mobile station 110 and forward the authentication request to an authentication server. The access point 130 may establish Internet protocol (IP) connectivity with the mobile station 110 based on a response received from the authentication server. After the mobile station 110 has established IP connectivity with the access point 130, data packets sent from the mobile station 110 to the access point 130 may be routed by the access point 130 to a controlled port associated with a data connectivity service.

During a third exemplary operation of the system 100, service discovery by unauthenticated devices may be supported by enabling such devices to temporarily receive a restricted Internet protocol address that is restricted for use in service discovery operations. For example, the mobile station 110 may receive one of a beacon and a probe response from the access point 130. The beacon or the probe response may include information indicating whether the access point 130 issues restricted Internet protocol addresses that are each restricted for use with service discovery messages. For example, the access point 130 may maintain a list of unallocated Internet protocol addresses (e.g., the Internet protocol addresses 140) including at least one restricted Internet protocol address that is restricted for use in a service discovery procedure. When the beacon or probe response indicates that the access point 130 issues the restricted Internet protocol addresses, the mobile station 110 may request such an address from the access point 130 to temporarily associate (without authentication) with the access point 130 for the purpose of performing service discovery.

The access point 130 may receive the request from the mobile station 110 and determine a number of times the mobile station 110 has requested to associate without authentication (and/or has requested restricted Internet protocol addresses). Where a determination is made that the number of times is less than a threshold amount, the access point 130 may associate without authentication and issue the restricted Internet protocol address to the mobile station 110. The mobile station 110 may receive the restricted Internet protocol address from the access point 130 and may generate a service discovery message. The mobile station 110 may send a data packet including the service discovery message and the received restricted Internet protocol address, via the wireless interface 122, to the access point 130.

The access point 130 may receive the data packet and put the data packet through a filtering process. During filtering, the access point 130 may determine whether the Internet protocol address (e.g., source address) of the data packet is one of the restricted Internet protocol addresses (e.g., by comparing the included Internet protocol address to the list of Internet protocol addresses 140). The access point 130 may also determine whether the restricted Internet protocol address is valid, as further described herein with reference to FIGS. 9-12.

When the access point 130 determines that the data packet includes the service query message and a valid restricted Internet protocol address, the access point 130 may advance, route, and/or forward the service query message to a destination (e.g., an advertising server or network device) and may obtain a response to the service query message. The access point 130 may send the response to the mobile station 110.

The mobile station 110 may receive the response and, based on the response, request the access point 130 to issue an authenticated Internet protocol address to the mobile station 110. For example, after performing service discovery for a particular service (e.g., network printing) via the temporary Internet protocol address and receiving a response indicating that the particular service is available, the mobile station 110 may initiate an authentication procedure (e.g., a handshake procedure) with the access point 130. The authenticated Internet protocol address may indicate that the mobile station 110 is in an authenticated state with respect to the access point 130. The access point 130 may receive the request to issue the authenticated Internet protocol address and may issue the authenticated Internet protocol address to the mobile station 110 after completion of the authentication procedure.

The system 100 of FIG. 1 may thus enable a mobile station to use layer 3 protocols for service discovery before the mobile station is fully authenticated and/or assigned an IP address.

Figure 2:
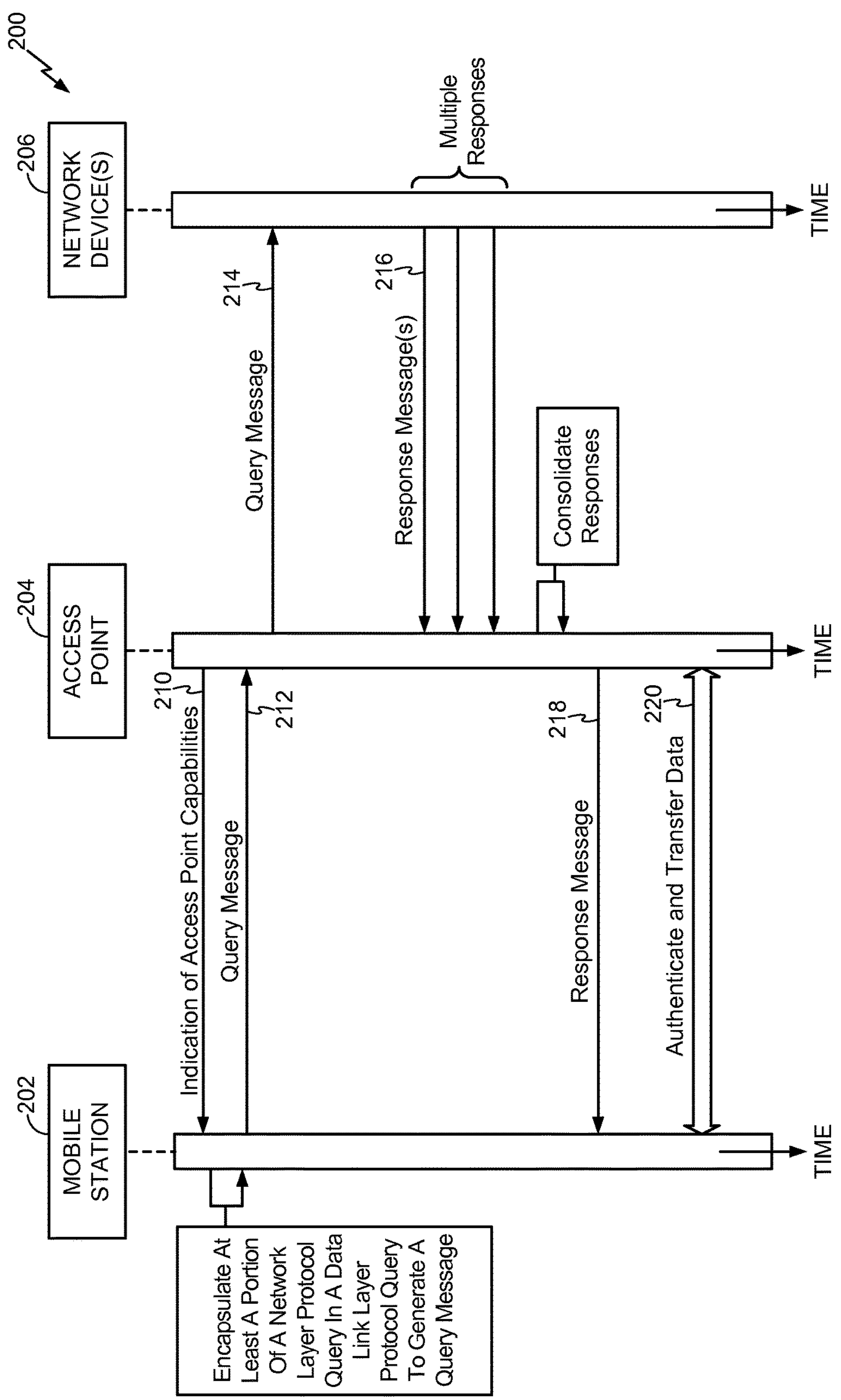
FIG. 2 is a ladder diagram to illustrate a particular embodiment of a method of communicating service discovery messages between a mobile station and a network device via an access point.

FIG. 2 depicts a particular illustrative embodiment of a method 200 of communicating between a representative mobile station 202, a representative access point 204, and a representative network device or network devices 206. The method 200 is illustrated by a ladder diagram. In a particular illustrative embodiment, the mobile station 202 may include the mobile station 110 of FIG. 1, the access point 204 may include the access point 130, the information server 160 of FIG. 1, or an advertisement server, and the network device 206 may include the first network device 170, the second network device 172, or an advertisement server. The mobile station 202, the access point 204, and the network device 206 may communicate via a wired network, a wireless network, or a combination thereof.

In a particular illustrative embodiment, the access point 204 may send an indication of access point capabilities 210 to the mobile station 202. For example, the access point 204 may send a response to a probe request from the mobile station 202 or may broadcast (e.g., periodically) a beacon that includes an indication of capabilities of the access point 204. The capabilities of the access point 204 may indicate whether or not the access point is generic advertisement service (GAS) protocol compliant. The mobile station 202 may determine the capabilities of the access point 204 based on the received indication of access point capabilities 210.

Upon determining that the access point 204 is GAS protocol compliant, the mobile station 202 may encapsulate at least a portion of a network layer protocol query (e.g., a Bonjour or uPnP query) in a generic advertisement service (GAS) protocol query to generate a query message 212. The network layer protocol query may be constructed to query the network device 206 for information associated with one or more services that the network device 206 provides. The mobile station 202 may send the query message 212 to the access point 204. For example, the query message 212 may include the discovery message 190 of FIG. 1. In response to receiving the query message 212, the access point 204 may transmit a query message 214 to one or more network devices 206. For example, the access point 130 may transmit a query message to the information server 160, the first network device 170, the second network device 172, or a combination thereof, using one of a unicast transmission and/or a multicast transmission via the network 180 of FIG. 1. In a particular embodiment, the query message 214 may include or may be based on the portion of the higher layer protocol query that was encapsulated in the query message 212.

In response to receiving the query message 214, the network device 206 may send a response message 216 to the access point 204. In a particular embodiment, the network device 206 sends a plurality of response messages 216. In another particular embodiment, each of a plurality of network devices sends one or more response messages 216. For example, one or more of the information server 160 (e.g., a GAS server), the first network device 170, and the second network device 172 of FIG. 1 may send a response message to the access point 130 of FIG. 1. In the event the access point 204 receives more than one response message, the access point 204 may consolidate a number of the one or more response messages into a single consolidated response message. The one or more response messages may be responsive to the portion of the network layer protocol query. In a particular embodiment, the access point 204 consolidates a portion of each of two or more response messages into a single consolidated response message.

After receiving the portion(s) of the response message(s) 216 (or an entirety of the response messages 216), the access point 204 may send a response message 218 to the mobile station 202. In a particular embodiment, the response message 218 is responsive to the query message 212. For example, the access point 130 may send the discovery message 192 that is responsive to the service discovery message 190 to the mobile station 110. After receiving the response message 218, the mobile station 202 may authenticate/associate with the access point 204 and may transfer data 220 with the access point 204 (e.g., to communicate with the network device 206 after determining that the network device 206 provides a particular service).

Thus, the method 200 may provide a method of communicating a network layer protocol message (e.g., a layer 3 protocol message) from a mobile station to a network device via an access point when the mobile station has not been authenticated with the access point and has not yet received authorization to communicate network layer protocol messages directly. While a particular mobile station 202 and a particular network device 206 have been shown, it should be understood that one or more mobile stations and/or network devices may communicate with an access point.

Figure 3:
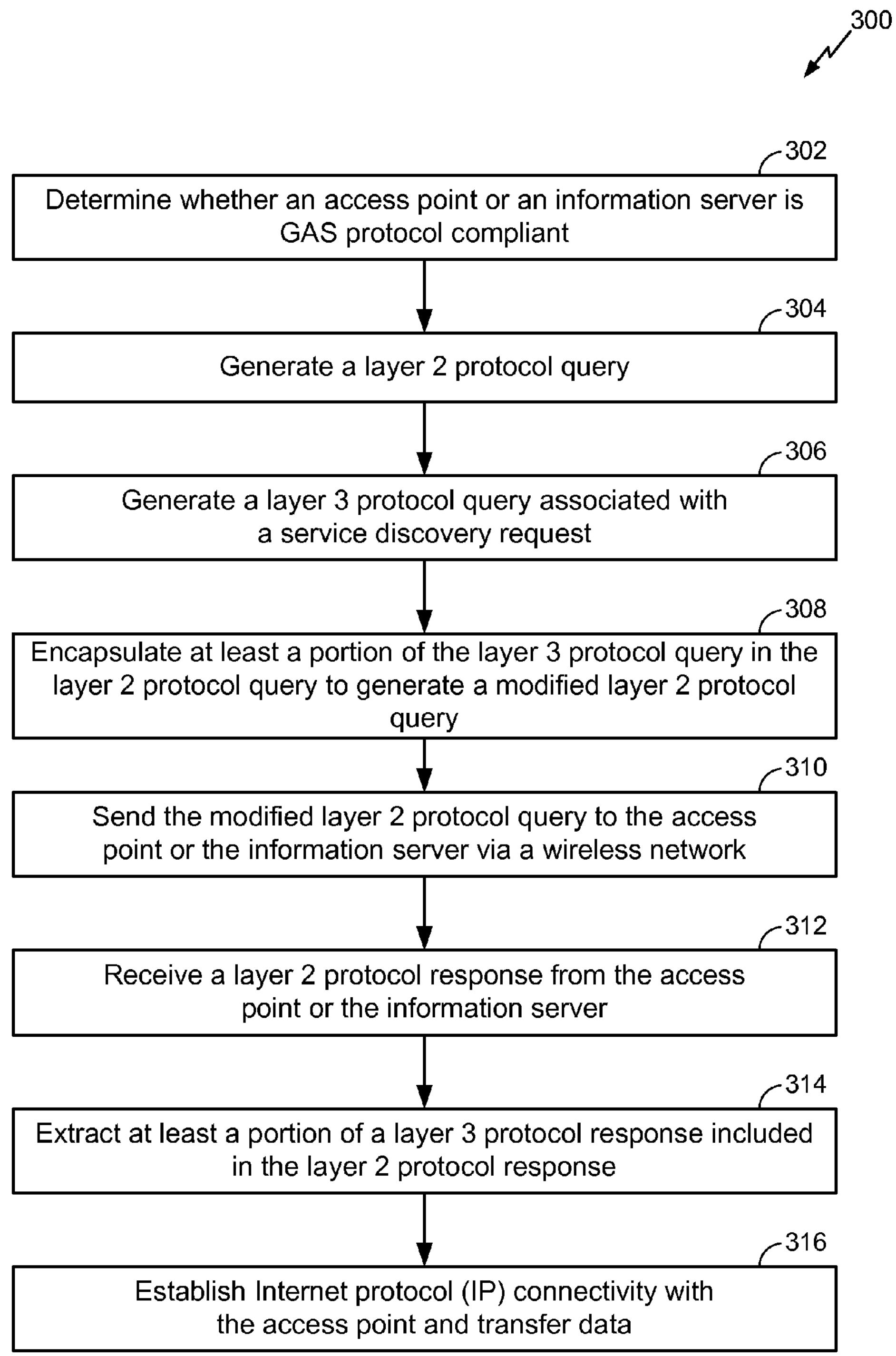
FIG. 3 is a flowchart to illustrate a particular embodiment of a method of communicating service discovery messages between a mobile station and an access point or an advertisement server, such as a generic advertisement service (GAS) server.

FIG. 3 is a flow diagram of a first illustrative embodiment of a method 300 of communicating service discovery messages between a mobile station and an access point. For example, the mobile station and the access point may include the mobile station 110 and the access point 130 of FIG. 1 or the mobile station 202 and the access point 204 of FIG. 2, respectively. The method 300 may include determining whether an access point or an information server, such as a generic advertisement service (GAS) server, is GAS protocol compliant, at 302. For example, the mobile station 110 may determine whether the access point 130 of FIG. 1 is GAS compliant or the mobile station 202 may determine whether the access point 204 of FIG. 2 is GAS protocol compliant. In a particular embodiment, the mobile station determines whether the access point is GAS protocol compliant based on a beacon or a probe response from the access point. The beacon or probe response may also identify a particular layer 3 protocol (e.g., network layer protocol) that is supported by the access point for service discovery (e.g., the beacon or probe response may indicate that the access point supports uPnP). The beacon message may also identify types of services available via the access point, such a media service, a print service, and a financial service.

The method 300 may further include generating a layer 2 protocol query, at 304, and generating a layer 3 protocol query associated with a discovery request, at 306. For example, after determining from the beacon or probe response that the access point is GAS compliant and supports uPnP, a mobile station may elect to perform service discovery by encapsulating uPnP queries into GAS protocol queries. The method 300 may include encapsulating at least a portion of the layer 3 protocol query in the layer 2 protocol query to generate a modified layer 2 protocol query, at 308. For example, the mobile station 110 of FIG. 1 or the mobile station 202 of FIG. 2 may encapsulate the portion of the layer 3 protocol query in the layer 2 protocol query to generate the modified layer 2 query. The layer 3 protocol query may be configured to query the access point for information about a service provided by the access point, a service provided by a network device coupled to the access point, or any combination thereof. In a particular embodiment, a plurality of layer 3 protocol queries are generated and portions thereof are consolidated by the mobile station into the portion of the layer 3 protocol query that is encapsulated in the layer 2 protocol query to generate the modified layer 2 protocol query. In another particular embodiment, the layer 2 protocol query corresponds to a media access control (MAC) address layer and the layer 3 protocol query corresponds to an Internet protocol layer.

The method 300 may include sending the modified layer 2 protocol query to the access point or the information server via a wireless network, at 310. In a particular embodiment, the mobile station may send the modified layer 2 protocol query to the access point prior to establishing IP connectivity with the access point. For example, the mobile station 110 may send the modified layer 2 protocol query (e.g., the service discovery message 190) to the access point 130 or the information server 160 of FIG. 1. As another example, the mobile station 202 may send the modified layer 2 protocol query (e.g., the query message 212) to the access point 204 of FIG. 2.

The method 300 may include receiving a layer 2 protocol response from the access point or the information server, at 312, and extracting a layer 3 protocol response included in the layer 2 protocol response, at 314. The layer 2 protocol response from the access point or the information server may be responsive to the modified layer 2 protocol query. For example, the mobile station 110 may receive the layer 2 protocol response (e.g., the service discovery message 192) from the access point 130 or the information server 160 of FIG. 1. As another example, the mobile station 202 may receive the layer 2 protocol response (e.g., the response message 218) from the access point 204 of FIG. 2.

In a particular embodiment, when the layer 2 protocol response is received from the information server (e.g., the information server 160 of FIG. 1), a format of the layer 2 protocol response is the same as a format of the layer 2 protocol query. In another particular embodiment, the format of the layer 2 protocol response is different than the format of the layer 2 protocol query. In an alternative embodiment, an upper layer protocol response (e.g., the layer 3 protocol response) is not received in a layer 2 protocol response. The access point 130 may receive the upper layer protocol response (e.g., a Bonjour protocol message or a universal Plug and Play (uPnP)) and may add a header to the received upper layer protocol message, thus maintaining a format of the upper layer protocol message. The added header may qualify which service discovery protocol is used in the upper layer protocol response. The mobile station 110 may receive the upper layer protocol response and the added header from the access point 130.

The layer 2 protocol response may include (e.g., encapsulate) portions of one or more layer 3 protocol responses that are responsive to the portion of the layer 3 protocol query. The layer 3 protocol response(s) may include identifier(s) associated with network service(s) provided by network device(s) connected to the access point. The mobile station 202 may extract the portions of the layer 3 protocol response(s) from the layer 2 protocol response. In a particular embodiment, the layer 2 protocol response includes a consolidated layer 3 protocol response that includes portions of a plurality of layer 3 protocol responses. The mobile station 202 may extract the consolidated layer 3 protocol response from the layer 2 protocol response and parse the portions of the consolidated layer 3 protocol response to retrieve each portion of the layer 3 protocol response of the multiple portions of the plurality of layer 3 protocol responses.

The method 300 may include establishing Internet protocol (IP) connectivity with the access point and transferring data, at 316. For example, a mobile station may initiate an authentication procedure (e.g., an association procedure) with an access point subsequent to receiving the layer 2 protocol response. The authentication procedure may include a handshake procedure and Internet protocol (IP) connectivity may be established with the access point after completion of the authentication procedure. For example, the mobile station 110 may establish IP connectivity with the access point 130 of FIG. 1 or the mobile station 202 may establish IP connectivity with the access point 204 of FIG. 2.

The method 300 of FIG. 3 may thus enable, via encapsulation of higher layer protocol queries/responses into lower layer protocol queries/responses, communication between a mobile station and a network device for service discovery purposes when the mobile station is not fully authenticated with the access point. By enabling the use of higher layer protocol (e.g., Bonjour or uPnP) queries even when the mobile station is not fully authenticated, the method 300 of FIG. 3 may enable the mobile station to obtain increased detail regarding available services that would not be available via lower layer protocol (e.g., GAS protocol) queries/responses.

Figure 4:
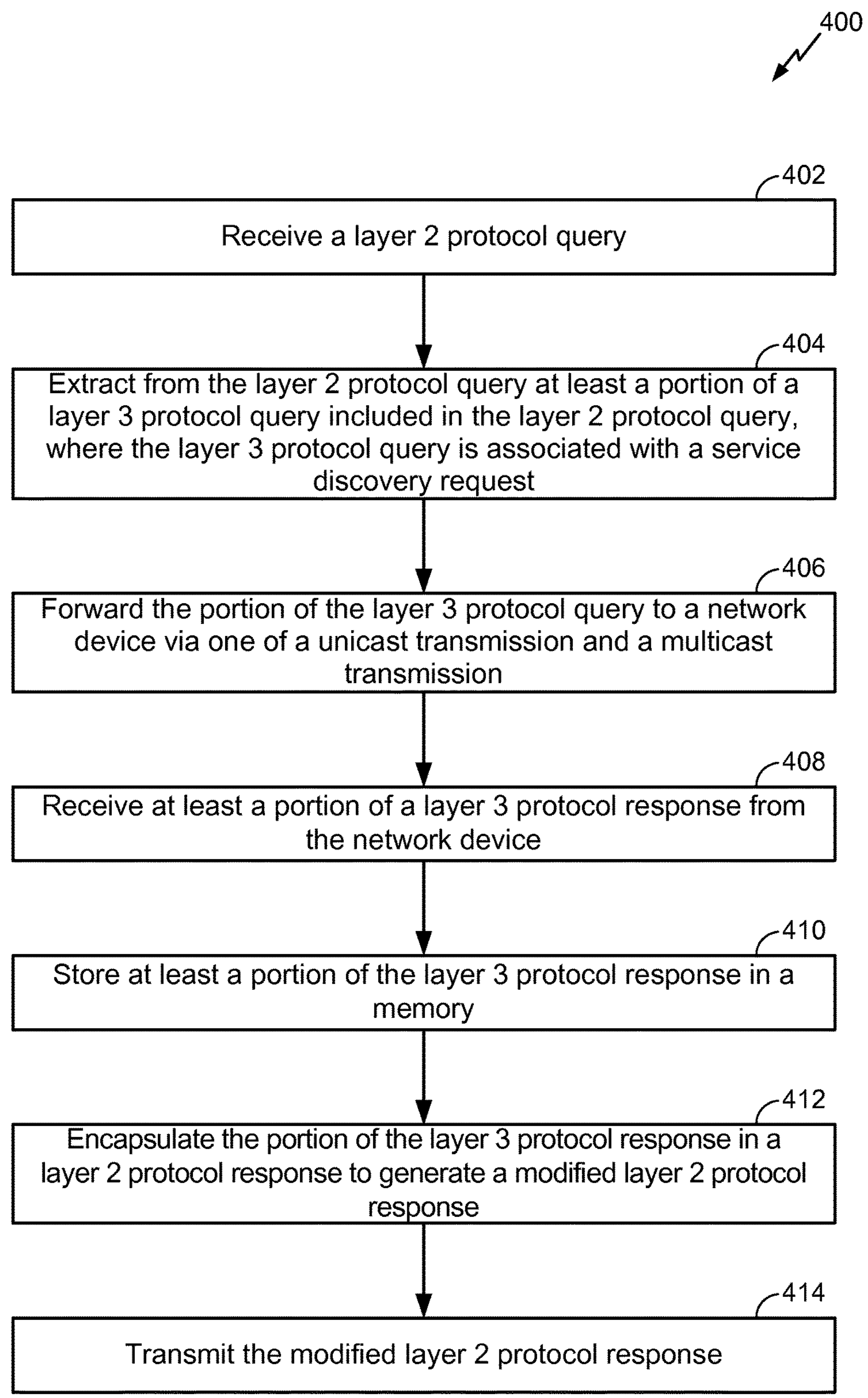
FIG. 4 is a flowchart to illustrate another particular embodiment of a method of communicating service discovery messages.

FIG. 4 is a flow diagram of an illustrative embodiment of a method 400 of communicating service discovery messages. The method 400 may receive a layer 2 protocol query, at 402, and extract from the layer 2 protocol query at least a portion of a layer 3 protocol query included in the layer 2 protocol query, where the layer 3 protocol query is associated with a service discovery request, at 404. For example, the access point 130 of FIG. 1 or the access point 204 of FIG. 2 may receive the layer 2 protocol query and extract the portion of the layer 3 protocol query from the layer 2 protocol query.

In a particular embodiment, the access point may determine whether a response to the portion of the layer 3 protocol query can be generated based on information previously stored in a memory of the access point. For example, when the query (or the portion of the query) is a query for media services and the access point has previously responded to such a query (e.g., from a different mobile station), the access point may have cached (e.g., stored) information regarding available media services in a storage location (e.g., a memory) of the access point. Thus, instead of querying connected network devices (e.g., connected to the access point) regarding media services, the access point may instead formulate a response based on information retrieved from memory. In a particular embodiment, the access point may maintain and/or refresh the cache of service information periodically and/or each time service discovery operations are performed.

In embodiments where the access point does not maintain a cache or service discovery information, or when information in the cache is outdated or not applicable, the method 400 may include forwarding the portion of the layer 3 protocol query to a network device via one of a unicast transmission and a multicast transmission, at 406. For example, the access point 130 may forward the portion of the layer 3 protocol query to one of the information server 160 (e.g., a GAS server), the first network device 170, and the second network device 172 of FIG. 1. As another example, the access point 204 may forward the portion of the layer 3 protocol query to the network device(s) 206. The method 400 may include receiving at least a portion of a layer 3 protocol response from the network device, at 408, and storing the portion of the layer 3 protocol response in a memory, at 410. The layer 3 protocol response may be responsive to the layer 3 protocol query. In a particular embodiment, an entirety of the layer 3 protocol response is received and stored. For example, the access point 130 may receive the portion of the layer 3 protocol response from one of the information server 160, the first network device 170, or the second network device 172 of FIG. 1, or the access point 204 may receive the layer 3 protocol response (e.g., the response message(s) 216 from the network device(s) 206 of FIG. 2).

In a particular embodiment, the access point receives a plurality of layer 3 protocol responses from a plurality of network devices. The access point may consolidate the plurality of layer 3 protocol responses into the layer 3 protocol response prior to encapsulating the layer 3 protocol response into the layer 2 protocol response. In a particular embodiment, the access point consolidates a portion of two or more of the received layer 3 protocol responses.

The method 400 may encapsulate the portion of the layer 3 protocol response in a layer 2 protocol response to generate a modified layer 2 protocol response, at 412, and transmit the modified layer 2 protocol response, at 414. For example, the access point 130 may encapsulate the portion of the layer 3 protocol response in a layer 2 protocol response to generate the modified layer 2 protocol response and may transmit the modified layer 2 protocol response to the mobile station 110 of FIG. 1. As a further example, the access point 204 may encapsulate the portion in the layer 3 protocol response in a layer 2 protocol response to generate the modified layer 2 protocol response and transmit the modified layer 2 protocol response to the mobile station 202 of FIG. 2. In a particular embodiment, the layer 2 protocol message is a GAS response message including a GAS frame.

The method 400 of FIG. 4 may enable, via encapsulation of higher layer protocol queries/responses into lower layer protocol queries/responses, communication between a mobile station and a network device for service discovery purposes when the mobile station is not fully authenticated with the access point. By enabling the use of higher layer protocol queries even when the mobile station is not fully authenticated, the method 400 of FIG. 4 may enable the mobile station to obtain increased detail regarding available services that would not be available via lower layer protocol (e.g., GAS protocol) queries/responses.

Figure 5:
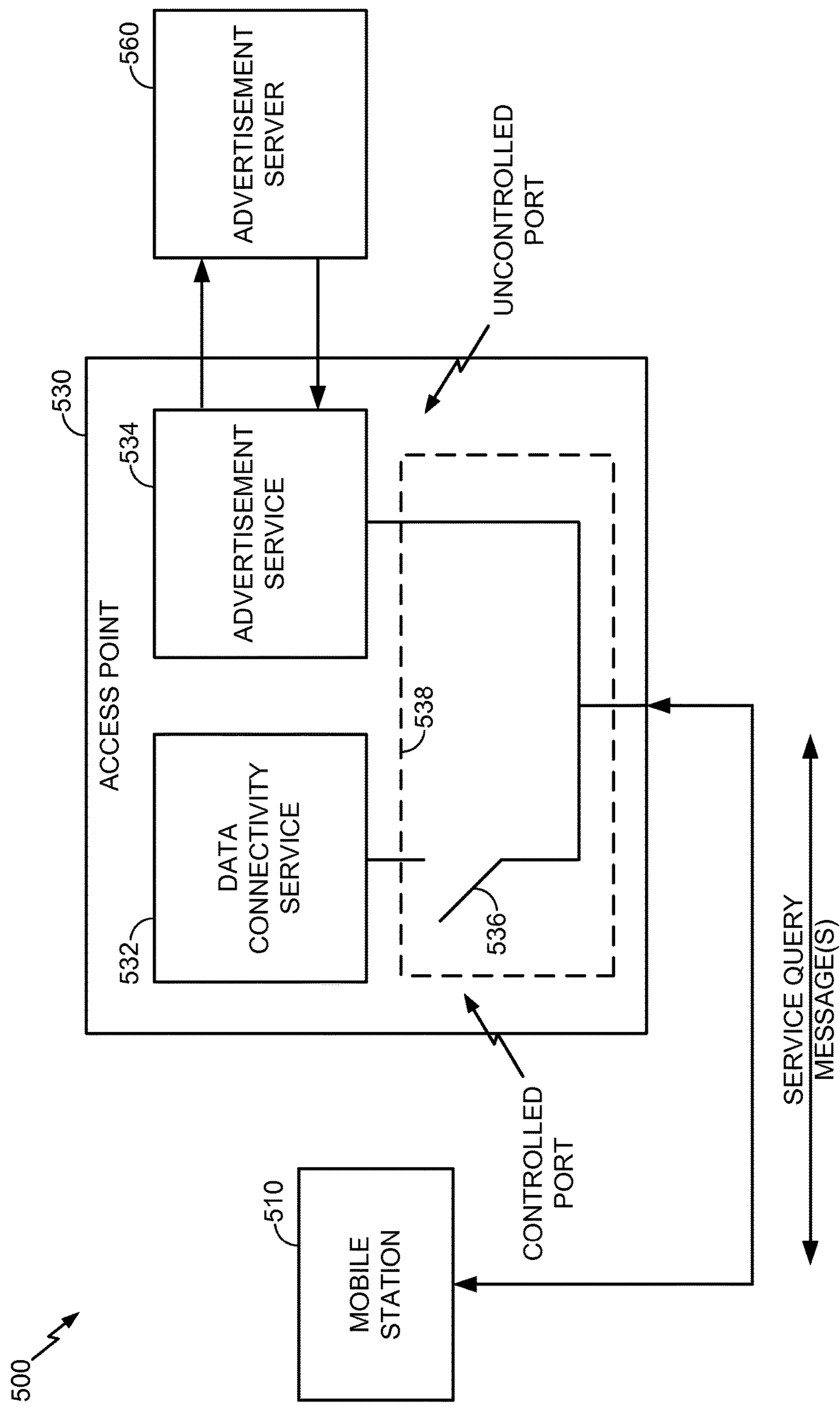
FIG. 5 is a diagram of a particular embodiment of a system that is operable to communicate service discovery messages between a mobile station and an advertisement server via an uncontrolled port of an access point.

Referring to FIG. 5, a particular illustrative embodiment of a system 500 is shown. The system 500 may be configured to enable communication of service discovery messages between a mobile station and an advertisement server via an uncontrolled port of an access point. In contrast to a controlled port, an uncontrolled port of an access point may accept certain messages from a mobile station even if the mobile station is unauthenticated. The system 500 may include a mobile station 501, an access point 530, and an advertisement server 560. For example, the mobile station 501 may include the mobile station 110 of FIG. 1, the access point 530 may include the access point 130 of FIG. 1, and the advertisement server 560 may include the information server 160, the first network device 170, or the second network device 172 of FIG. 1.

The mobile station 510 may be coupled to the access point 530 via a wired connection, a wireless connection, or a combination thereof. The mobile station 510 may be configured to transmit an encapsulated service query message to the access point 530. The service query message may include a layer 3 protocol (e.g., a network layer protocol) message or a higher protocol discovery message. In a particular embodiment, the layer 3 protocol message includes a Bonjour protocol message, a universal Plug and Play (uPnP) protocol message, or a combination thereof.

In a particular embodiment, the mobile station 510 encapsulates the service discovery message in an extensible authentication protocol over local area network (EAPOL) protocol data unit (PDU). The EAPOL PDU may include a type-length-value (TLV) element field, as described further with reference to FIG. 6. The TLV element field may include a discovery message field into which the service query message is encapsulated. The service query message may be sent in the EAPOL PDU to an uncontrolled port of the access point 530. In a particular embodiment, an 802.11 authentication request (e.g., a request that complies with at least one Institute of Electrical and Electronics Engineers (IEEE) 802.11 standard) may be used to carry the EAPOL PDU sent to the access point 530. In another particular embodiment, the uncontrolled port is in compliance with an IEEE 801.1X standard.

In another particular embodiment, the mobile station 510 encapsulates the service query message in a data frame including an ethertype that identifies a payload of the data frame as including a service discovery message. The ethertype may include a two-octet field in an Ethernet frame that is used to indicate which protocol is encapsulated in the payload of the Ethernet frame. For example, an ethertype value of "08-00" may indicate that an Internet Protocol (IP) packet is included in the frame. In a particular embodiment, a customized ethertype is created and used to indicate the presence of a service discovery message in the frame. In another particular embodiment, the mobile station 510 encapsulates the service discovery message in a public action frame designated for service discovery messages.

The access point 530 may include a data connectivity service 532, an advertisement service 534, and a data packet router 538 having a switch 536. For example, the data packet router 538 may include the data packet router 144 of FIG. 1. The access point 530 may receive data packets from the mobile station 510, and the data packet router 534 may route the received data packets to the data connectivity service 532 via a controlled port or to the advertisement service 534 via the uncontrolled port. The data packet router may use the switch 536 to control access to the data connectivity service 532. The advertisement service 534 may be coupled to the advertisement server 560. The access point 530 may also include an authentication service (not shown) that may be coupled to an authentication server (not shown). The authentication service may receive data packets from the mobile station 510 via the same or a different uncontrolled port of the access point 530.

In a particular embodiment, the advertisement service 534 may convert a received service query message from a first format corresponding to a first protocol to a second format corresponding to a second protocol. The second protocol may be associated with the particular advertisement server 560 to which the service query message is to be sent.

In another particular embodiment, the access point 530 may receive an EAPOL PDU and identify a TLV element field of the PDU as including a service discovery request based on a value of a TLV type field in the TLV element field. The access point 530 may route the service discovery request included in the EAPOL PDU to the advertisement server 560 based on the TLV type field. In a particular embodiment, the access point 530 may receive the EAPOL PDU included in an 802.11 authentication request.

In a particular embodiment, the advertisement server 560 may be co-located with the access point 530. The advertisement server 560 may monitor all service discovery messages broadcast on a sub-network and cache the monitored service discovery messages in a concatenated form. The sub-network may be a network associated with the access point 530 and one or more network devices that may provide a service. For example, the sub-network may include the network 180 of FIG. 1. The advertisement server 560 may transmit a query message response that is responsive to a service query message (e.g., a service discovery request) using one or more service discovery protocols.

During operation, a data packet from the mobile station 510 including the service query message may be provided to the advertisement server 560 via the uncontrolled port of the access point 530. The service query message may include a layer 3 protocol request. The advertisement server 560 may send a response to the service query message to the mobile station 510 via the access point 530.

After service discovery is completed, the access point 530 may receive an authentication request from the mobile device 510. The access point 530 may forward the authentication request to the authentication server (not shown) via the same or a different uncontrolled port. The authentication request may include one or more credentials (e.g., cryptographic keys) associated with the mobile station 510 to enable Internet protocol (IP) connectivity to be established between the mobile station 510 and the access point 530 based on a response received from the authentication server. When IP connectivity is established between the mobile station 510 and the access point 530, data packets sent from the mobile station 510 to the access point 530 may be routed to the controlled port of the access point 530.

The system 500 of FIG. 5 may thus enable, by leveraging a port based architecture, a mobile station that may use layer 3 protocols for service discovery before the mobile station is fully authenticated and/or assigned an IP address. The system 500 may leverage the port based architecture to provide protection to a network from the mobile station that is searching for services. By enabling use of the port based architecture, the system 500 of FIG. 5 may enable the mobile station to obtain increased detail regarding available services that would not be available via layer 2 protocol alone.

Figure 6:
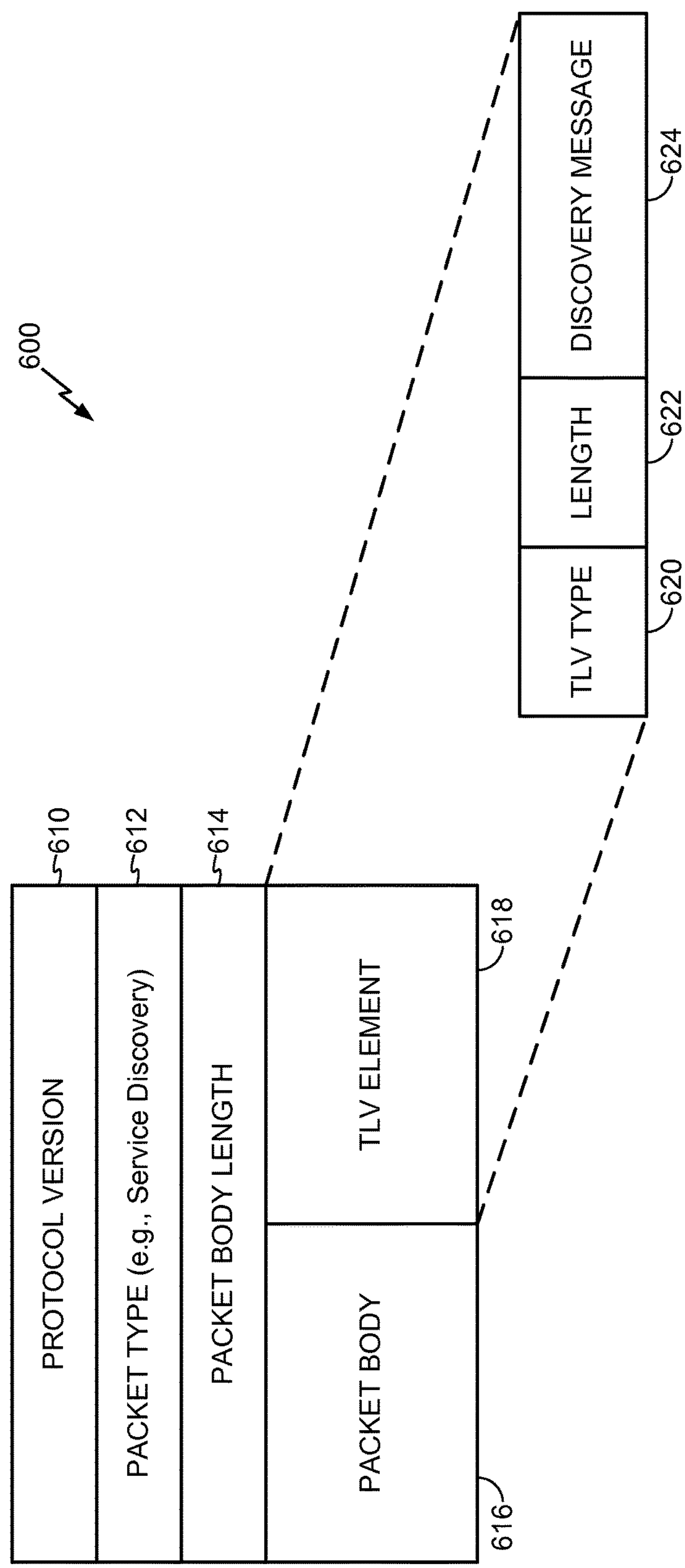
FIG. 6 is a diagram to illustrate an embodiment of a data structure useable in conjunction with communication service query messages.

FIG. 6 is an illustration of particular embodiments of a data structure 600 that may be used to communicate service discovery messages (e.g., service query messages or service response messages). For example, the data structure 600 may be used to communicate the service discovery messages between the mobile station 510, the access point 530, and the advertisement server 560 of FIG. 5.

As shown in FIG. 6, the data structure 600 may have a protocol version field 610, a packet type filed 612, a packet body length 614, a packet body 616, and a type-length-value (TLV) element field 618. In a particular embodiment, the data structure 600 includes an extensible authentication protocol over local area network (EAPOL) protocol data unit (PDU). In a particular embodiment, the data structure 600 further includes a service discovery server uniform resource identifier (URI) and a service discovery packet. The service discovery server URI may be specified by a mobile station, such as the mobile station 510 of FIG. 5.

The TLV element field 618 may include a TLV type field 620, a length field 622, and a discovery message field 624. The TLV type field 620 may include first data that identifies the TLV element field 618 as a service discovery message TLV element. In a particular embodiment, the TLV type field 620 includes 7 bits. The TLV type field 620 may enable an access point, such as the access point 530 of FIG. 5, to identify that the TLV element field 618 includes a service discovery message to be provided to an uncontrolled port of the access point. The TLV length field 622 may include second data that identifies a length of payload data included in the discovery message field 624. In a particular embodiment, the length field 622 includes nine bits. The discovery message field 624 may include an encapsulated service discovery protocol message. In a particular embodiment, the discovery message field 624 includes a layer 3 protocol discovery message. The layer 3 protocol discovery message may include one of a Bonjour protocol message, a universal Plug and Play (uPnP) protocol message, or a zero-conf based protocol message.

Figure 7:
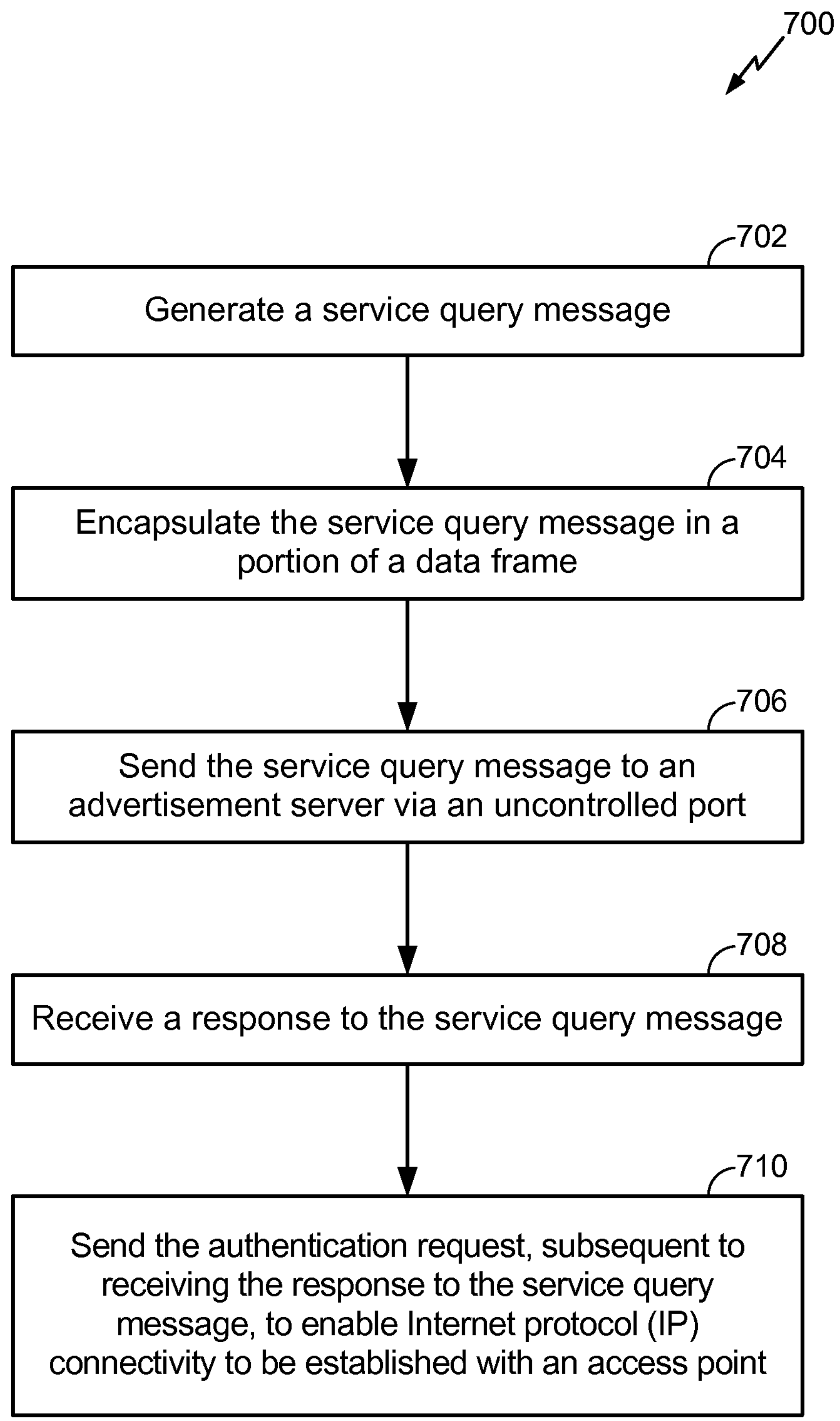
FIG. 7 is a flowchart to illustrate a particular embodiment of a method of communicating a service query message to an advertisement server via an uncontrolled port.

FIG. 7 is a flow diagram of a particular embodiment of a method 700 of communicating a service query message to an advertisement server via an uncontrolled port. To illustrate, an access point may include an uncontrolled port via which service discovery messages (e.g., service query messages or service response messages) may be communicated between a mobile station and an advertisement server.

The method 700 may generate a service query message, at 702, and encapsulate the service query message in a portion of a data frame, at 704. For example, the data frame may include the discovery message 192 of FIG. 1, the service query message(s) shown in FIG. 5, or the data structure 600 of FIG. 6. In a particular embodiment, the service query message is included in a TLV element field of an EAPOL PDU. In another particular embodiment, the service query message is encapsulated into a particular field of a public action frame.

The method 700 may send the service query message to an advertisement server via an uncontrolled port, at 706, and receive a response to the service query message, at 708. For example, the mobile station 510 of FIG. 5 may send the service query message to the advertisement server 560 via the uncontrolled port of the access point 530 and may receive a response from the advertisement server 560 via the access point 530. In a particular embodiment, the service query message is included in a data frame and sent to the access point prior to the mobile station being authenticated by the access point. In another particular embodiment, the response received by the mobile station includes an EAPOL PDU having a type-length-value (TLV) element field that includes a service discovery response. The mobile station may parse the TLV element field from the EAPOL PDU and extract the response from the parsed TLV element field.

The method 700 may further send an authentication request, subsequent to receiving the response to the service query message, to enable Internet protocol (IP) connectivity to be established with an access point, at 710. For example, the mobile station 510 may generate an authentication request subsequent to receiving the response to the service query message and may send the authentication request to the access point 530. The authentication request may initiate an association procedure to establish Internet protocol (IP) connectivity between the mobile station 510 and the access point 530.

Figure 8:
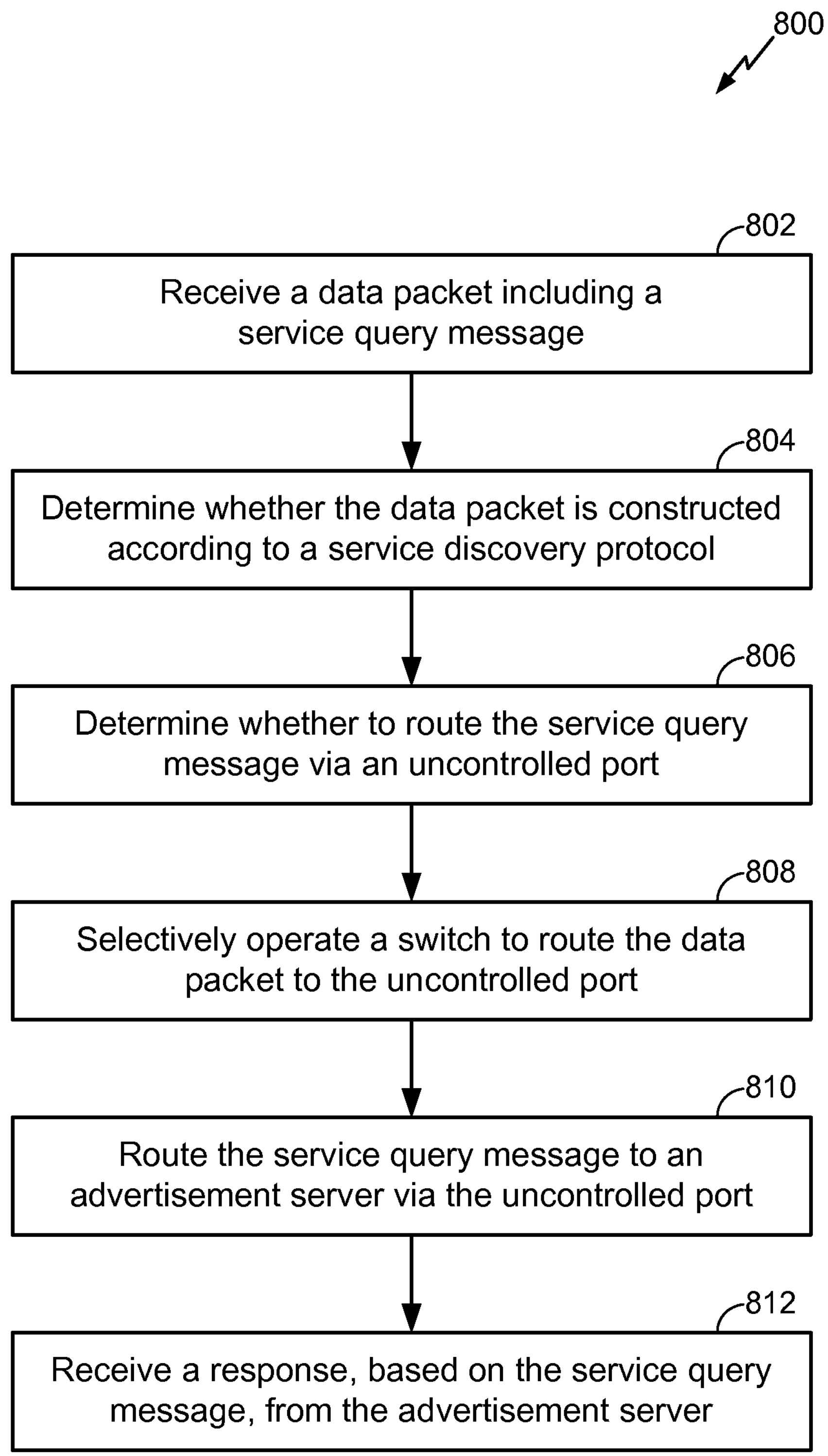
FIG. 8 is a flowchart to illustrate a particular embodiment of a method of routing a service query message to an advertisement server via an uncontrolled port.

FIG. 8 is a flow diagram of a method 800 to route a service query message to an advertisement server via an uncontrolled port. For example, an access point (e.g., the access port 530 of FIG. 5) may route the service query message to the advertisement server (e.g., the advertisement server 560 of FIG. 5).

The method 800 may receive a data packet including a service query message, at 802, and determine whether the data packet is constructed according to a service discovery protocol, at 804. In a particular embodiment, the access point monitors a plurality of received data packets for a particular data packet that includes the service query message. For example, the access point 530 may receive a data packet including a service query message from the mobile station 510 of FIG. 5.

In a particular embodiment, the received data packet includes a protocol data unit (PDU) including a data frame. The service query message may be encapsulated in a type-length-value (TLV) element field of the data frame. In a particular embodiment, the PDU includes a service discovery server uniform resource identifier (URI) associated with a particular advertisement server. The access point may provide the service query message to the particular advertisement server based on the service discovery server URI included in the PDU. In a particular embodiment, the access point may extract a service query message from the TLV element field of the data frame and provide the extracted service query message to the particular advertisement server.

In another particular embodiment, the access point receives an extensible authentication protocol over local area network (EAPOL) protocol data unit (PDU) including a type-length-value (TLV) element. The service query message may be included in the TLV element, and the access point may parse the TLV element from the EAPOL PDU to retrieve the service query message from the parsed TLV element.

In another particular embodiment, the access point may determine that the received data packet includes the service query message based on an ethertype included in the data packet that identifies a payload of the data packet as including the service discovery message.

The method 800 may determine whether to route the service query message via an uncontrolled port, at 806, and selectively operate a switch to route the data packet to the uncontrolled port, at 808. For example, the access point 530 may determine to route the service query message via the uncontrolled port and may selectively operate the switch 536 of the data packet router 538 of FIG. 5.

The method 800 may further route the service query message to an advertisement server via the uncontrolled port, at 810, and receive a response, based on the service query message, from the advertisement server, at 812. For example, the access point 530 may route the service query message to the advertisement server 560 of FIG. 5. In a particular embodiment, the access point may forward the response to the mobile station that originated the service query message. The access point may encapsulate the response into a field of a data frame and send the encapsulated response to the mobile station.

Figure 9:
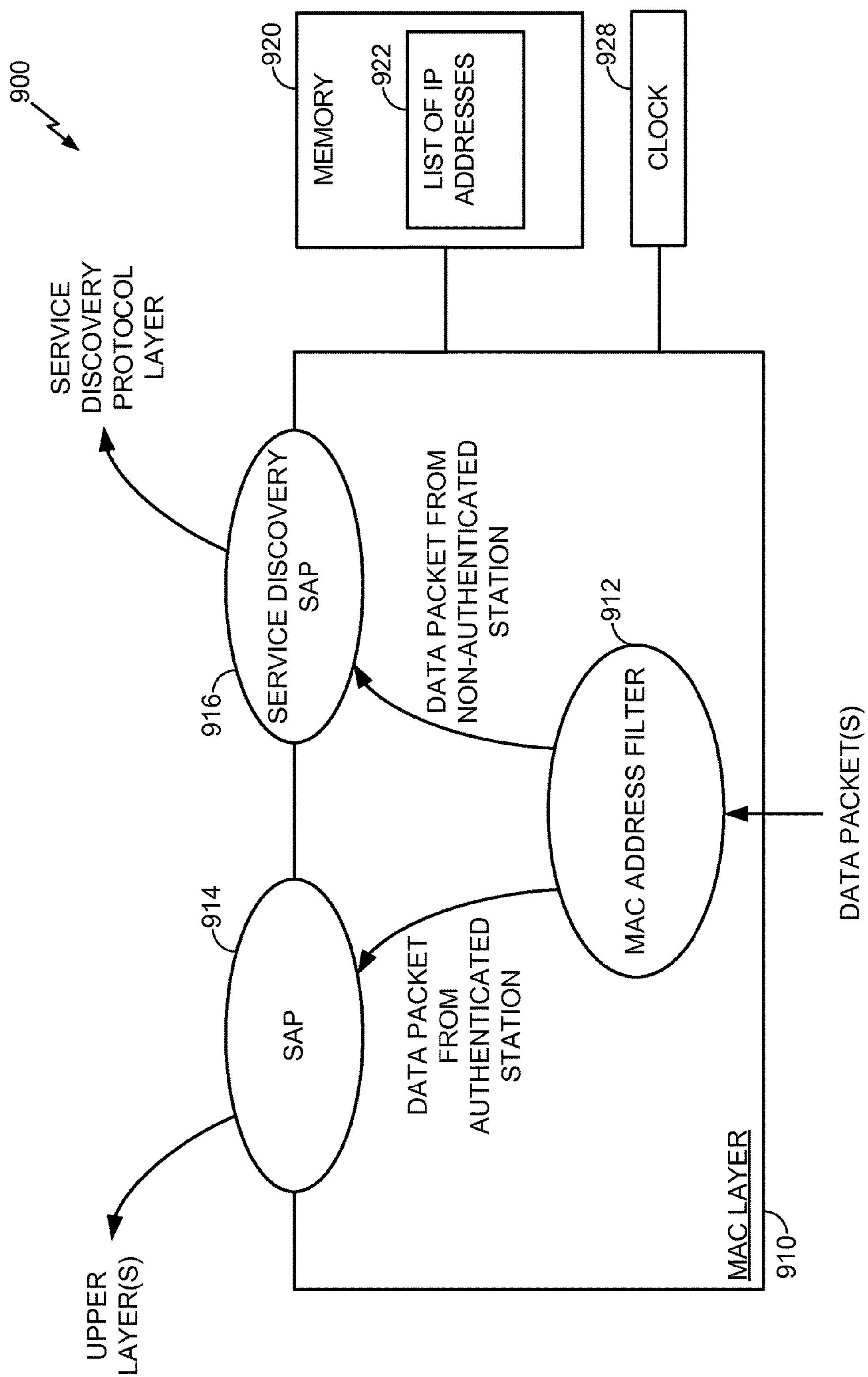
FIG. 9 is a diagram of a particular embodiment of a portion of an access point to route data packets including a restricted Internet protocol (IP) address that is restricted for use in a service discovery procedure.

Referring to FIG. 9, a particular illustrative embodiment of a system 900 configured to filter data packets is shown. The system 900 may include a media access control (MAC) layer 910 and a memory 920. In an illustrative embodiment, the MAC layer 910 and the memory 920 may be included in an access point, such as the access point 130 of FIG. 1, and the memory 920 may include the memory 136 of FIG. 1.

The MAC layer 910 may include a MAC address filter 912, a service access point (SAP) 914, and a service discovery SAP 916. The MAC address filter 912 may be associated with data link layer (e.g., layer 2) operations of an access point. The MAC address filter 912 determines whether a MAC address included in a data packet is associated with an Internet protocol (IP) address that was previously allocated to an authenticated mobile station or a non-authenticated mobile station. If the data packet does not include a MAC address that is known to the MAC address filter 912, the MAC address filter 912 may drop (e.g., discard) the data packet.

In a particular embodiment, the MAC address filter 912 may determine whether the MAC address included in the data packet is from an authenticated mobile station or from a non-authenticated mobile station based on a list of Internet protocol (IP) addresses 922 stored in the memory 920. The list of IP addresses 922 may include the Internet protocol addresses 140 of FIG. 1. For example, the list of IP addresses 922 may include a first subset of IP address to be issued after an authentication procedure (e.g., designating the authenticated mobile station) and a second subset of restricted IP addresses that are each restricted for use in a service discovery procedure and that are issued without an authentication procedure (e.g., designating the non-authenticated mobile station).

The MAC address filter 912 may identify the MAC address of the data packet and make one or more determinations to determine whether to route (e.g., forward) or drop the data packet. Each determination made by the MAC address filter 912 may be made using a processor, such as the processor 132 of FIG. 1. The MAC address filter 912 may determine whether the MAC address corresponds to a particular IP address included in the list of IP addresses 922. When the MAC address corresponds to the particular address in the list of IP address 922, the MAC address filter 192 may determine whether the particular IP address was issued to (e.g., corresponds to) an authenticated mobile station or a non-authenticated mobile station. When the IP address was issued to an authenticated mobile station (i.e., the data packet is from an authenticated mobile station), the MAC address filter 912 may pass (e.g., route) the data packet to the SAP 914. The SAP 914 may pass the data packet from the data link layer to an upper layer, such as a network layer (e.g., an Internet protocol (IP) layer, a transmission control protocol (TCP) layer, etc.) for further processing.

In contrast, when the IP address was issued to a non-authenticated mobile station (i.e., the data packet is from a non-authenticated mobile station that was allocated a restricted IP address reserved (e.g., restricted or limited) for use in service discovery), the MAC address filter 912 may determine whether the particular IP address is valid. Such a determination may enable setting expiration time periods for IP addresses that are restricted for service discovery. The MAC address filter 912 may determine whether the particular IP address is valid based on a time stamp associated with a time that the particular IP address was issued. For example, the MAC address filter 912 may determine the particular address to be valid when an elapsed time period since the time stamp was issued satisfies a time threshold. The elapsed time may be determined based on a clock 928 (e.g., a system clock) of the access point. For example, the system clock 928 may be maintained by the processor 132 of FIG. 1. In a particular embodiment, the elapsed time period satisfies the time threshold when the elapsed time period is less than the time threshold.

In another particular embodiment, a restricted IP address that is restricted for use with service discovery messages may be “temporary” in that the restricted IP address enables an associated and a non-authenticated mobile station to send up to a predetermined number of data packets (e.g., message attempts). The MAC address filter 912 may determine whether the particular IP address is valid based on a number of data packets received at the MAC address filter 912. The MAC address filter 912 may determine whether the number of data packets received at the MAC filter satisfies a threshold number of data packets. In a particular embodiment, the number of data packets received satisfies the threshold number of data packets when the number of data packets received is less than the threshold number of data packets.

When the particular IP address is not valid, the MAC address filter 912 may drop the data packet. When the particular IP address is valid, the MAC address filter 912 may pass (e.g., route) the data packet to the service discovery SAP 916.

The service discovery SAP 916 may determine whether the data packet includes a service discovery message. When the service discovery SAP 916 determines that the data packet does not include a service discovery message, the service discovery SAP 916 may drop the data packet. In this way, the service discovery SAP 916 may verify that mobile stations that operate using IP addresses restricted for use with service discovery messages are only permitted to transmit service discovery messages. When the service discovery SAP 916 determines that the data packet includes a service discovery message, the service discovery SAP 916 may pass the data packet from the data link layer to an upper layer, such as a network layer (e.g., an Internet protocol (IP) layer, a transmission control protocol (TCP) layer, etc.) for further processing.

Thus, in a particular embodiment, the SAP 914 and the service discovery SAP 916 may be located on a boundary of the data link layer and a network layer. In another particular embodiment, the SAP 914 and the service discovery SAP 916 may be included in the network layer to filter data packets at the network layer.

During operation, a data packet may be received at a first filter, such as the media access control (MAC) address filter 912 or other layer 2 protocol filter. The first filter may determine whether the data packet is associated with a particular Internet protocol (IP) address. In a particular embodiment, the first filter may determine whether the data packet is associated with a restricted Internet protocol (IP) address that is restricted (e.g. reserved) for use in a service discovery procedure (e.g., sending and/or receiving one or more service discovery messages). The first filter may also determine whether the restricted IP address is valid. The first filter may forward the data packet to a second filter, such as the service discovery SAP 916 when the data packet is associated with the restricted IP address and when the restricted IP address is valid.

The second filter may determine whether the data packet was constructed in accordance with a service discovery protocol. In a particular embodiment, the second filter may forward the data packet to a layer 3 protocol component for processing when the data packet includes a service discovery message.

The system 900 of FIG. 9 may thus enable a mobile station to use layer 3 protocols for service discovery, in conjunction with a restricted IP address that is restricted for use in a service discovery procedure, before the mobile station is fully authenticated.

Figure 10:
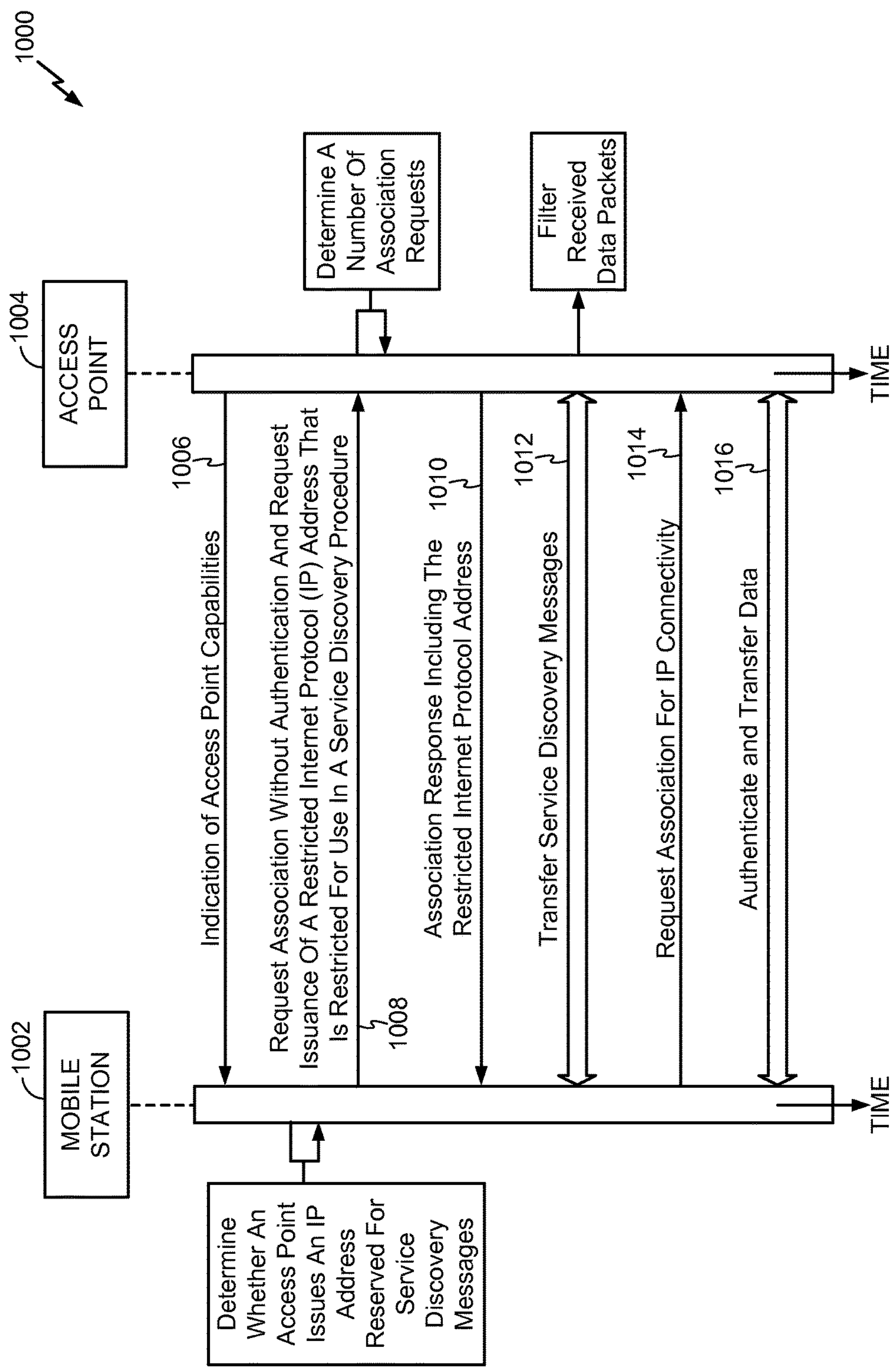
FIG. 10 is a ladder diagram to illustrate another particular embodiment of a method of communicating service discovery messages between a mobile station and an access point.

Referring to FIG. 10, a particular illustrative embodiment of a method 1000 of communicating between a representative mobile station 1002 and a representative access point 1004 is shown. The method 1000 is illustrated by a ladder diagram. In a particular illustrative embodiment, the mobile station 1002 may include the mobile station 110 of FIG. 1 and the access point 1004 may include the access point 130 or the information server 160 of FIG. 1, the system 900 of FIG. 9, or a combination thereof.

In a particular illustrative embodiment, the access point 1004 may send an indication of access point capabilities 1006 to the mobile station 1002. For example, the access point 1004 may send a probe response or a beacon that includes the access point capabilities 1004. The capabilities 1004 of the access point may indicate whether or not the access point supports temporary association with non-authenticated mobile devices for service discovery purposes. In a particular embodiment, the capabilities indicate whether or not the access point provides association without authentication and issues restricted Internet protocol (IP) addresses that are restricted for use in a service discovery procedure.

After receiving the indication of access point capabilities 1006, the mobile station 1002 may determine whether the access point 1004 can issue restricted Internet protocol (IP) addresses. A restricted IP address is restricted for use in a service discovery procedure and may enable the mobile station 1002 to send layer 3 protocol service discovery messages to be processed and/or forwarded by the access point 1004 without the data packet being dropped since the mobile station 1002 is non-authenticated. In response to a determination that the access point 1004 can issue the restricted IP address, the mobile station 1002 may request association without authentication and request issuance of the restricted IP address that is restricted for use in the service discovery procedure 1008. In a particular embodiment, the mobile station 1002 determines whether the access point 1004 provides association without authentication and requests the restricted IP address in response to a determination that the access point 1004 provides association without authentication. In another particular embodiment, the mobile station 1002 requests the access point 1004 to associate the mobile station 1002 without authentication of the mobile station 1002 (by the access point 1004) and requests the access point 1004 to issue the mobile station 1002 the restricted IP address. The request to associate without authentication and the request to issue the restricted IP address may be included in a single request sent from the mobile station 1002 to the access point 1004.

In response to receiving a request for association for service discovery messages, the access point 1004 may determine a number of times that the mobile station 1002 has requested association without authentication for service discovery messages. In a particular embodiment, the access point 1004 may determine a number of times that the mobile station 1002 has requested the access point 1004 to issue one of the restricted IP addresses maintained by the access point 1004. The access point 1004 may determine whether the number satisfies a threshold value. For example, in FIG. 1, the processor 132 of the access point 130 may determine whether the number of times that the mobile station 110 has requested association without authentication (and/or a temporary IP address) satisfies the threshold value. In a particular embodiment, the access point 1004 denies the request for association without authentication when the number satisfies the threshold value and issues the restricted IP address when the number of times does not satisfy the threshold value.

When the access point 1004 determines that the number of times satisfies the threshold, the access point 1004 may send an association response that allocates to the mobile station 1002 a restricted Internet protocol address that is restricted for use in a service discovery procedure 1010. In a particular embodiment, a subset of restricted IP addresses restricted (e.g., reserved) for service discovery may be smaller than a subset of IP addresses issued to authenticated stations. For example, if the access point 1004 supports allocation of two hundred fifty-six (256) IP addresses, two hundred fifty-one (251) of the IP addresses may be for secure data transfer and the remaining five (5) IP addresses may be restricted (e.g., reserved) for use in a service discovery procedure. After being allocated the restricted IP address, the mobile station 1002 may send and receive service discovery messages 1012 to and from the access point 1004 using the restricted IP address. In a particular embodiment, when the access point 1004 converts one of the five (5) restricted IP addresses to an IP address for secure data transfer, the access point identifies an unassigned IP address for secure data transfer and converts the unassigned IP address for secure data transfer to a restricted IP address to maintain a predetermined ratio of the IP addresses for secure data transfer to the IP addresses restricted for use in a service discovery procedure.

When receiving data packets from the mobile station 1002, the access point 1004 may filter the data packets, as described with reference to the MAC address filter 912, the SAP 914, and the service discovery SAP 916 of FIG. 9.

After service discovery is complete, the mobile station 1002 may request association for IP connectivity 1014 with the access point 1004. In response, the access point 1004 may authenticate the mobile station 1002 and allocate a second IP address to the mobile station 1002, where the second IP address is enabled for more than just service discovery. That is, the access point 1004 and the mobile station 1002 may perform an authentication process and transfer data 1016. For example, the mobile station 1002 may authenticate and transfer data 1016 with the access point 1004 in order to communicate with one or more network devices after determining that the one or more network devices provide a particular service that is of interest to the mobile station 1002.

Thus, the method 1000 provides a method of communicating a network layer protocol message (e.g., a layer 3 protocol message) from a mobile station to a network device via an access point when the mobile station has not been authenticated with the access point to communicate network layer protocol messages. While a single mobile station 1002 has been shown, it should be understood that one or more mobile stations may communicate with the access point 1004.

Figure 11:
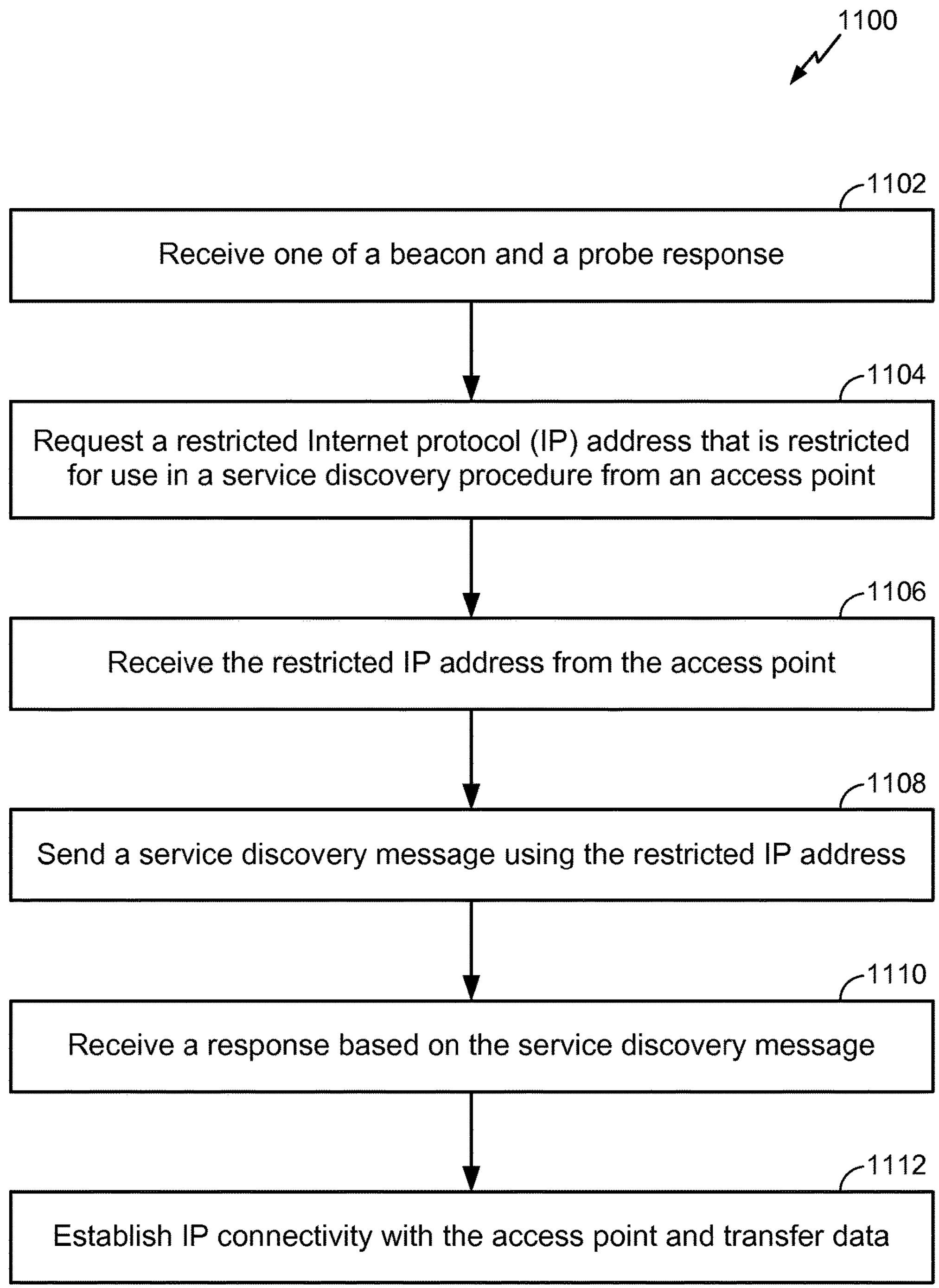
FIG. 11 is a flowchart to illustrate another particular embodiment of a method of communicating service discovery messages between a mobile station and an access point.

FIG. 11 is a flow diagram of an illustrative embodiment of a method 1100 of communicating service discovery messages between a mobile station and an access point. In a particular illustrative embodiment, the mobile station may include the mobile station 110 of FIG. 1 or the mobile station 1002 of FIG. 10, and the access point may include the access point 130 or the information server 160 of FIG. 1, the system 900 of FIG. 9, the access point 1004 of FIG. 10, or a combination thereof.

The method 1100 may include receiving one of a beacon and a probe response, at 1102. The beacon may include information (e.g., data) indicating whether the access point is configured to provide association without authentication and provide a restricted Internet protocol (IP) address that is restricted for use in a service discovery procedure. The probe response may be responsive to a probe request previously transmitted by a mobile station. Based on the beacon or the probe response, the mobile station may determine whether the access point provides association without authentication and/or issues the restricted IP addresses. In a particular embodiment, the mobile station may also determine what protocols are supported by the access point from the beacon or probe response.

The method 1100 may further include requesting a restricted IP address that is restricted for use in a service discovery procedure from an access point, at 1104, and receiving the restricted IP address from the access point, at 1106. The mobile station may be in a non-authenticated state with respect to the access point when the mobile station receives the restricted IP address. The restricted IP address may enable the mobile station to communicate a layer 3 protocol message with the access point. However, the layer 3 protocol messages that the mobile station is permitted to transmit to the access point 1004 may be limited to discovery protocol messages (e.g., service discovery messages and/or service discovery packets).

The method 1100 may include sending a service discovery message using the received restricted IP address, at 1108, and receiving a response based on the service discovery message, at 1110. The method 1100 may include establishing Internet protocol (IP) connectivity with the access point and transferring data, at 1112. In a particular embodiment, the mobile station may request the access point to convert the restricted IP address to an authenticated IP address. The access point may convert the restricted IP address to the authenticated IP address after completion of an authentication procedure (e.g., a handshake procedure). The access point may convert the restricted IP address by updating a list of IP addresses maintained by the access point. For example, the access point may update the Internet protocol addresses 140 of FIG. 1 or the list of IP addresses 922 of FIG. 9. Alternately, the access point may de-allocate the restricted IP address and allocate to the mobile station a new IP address that is not similarly restricted. When the mobile station is allocated the authenticated IP address, the mobile station may be in an authenticated state with respect to the access point.

Figure 12:
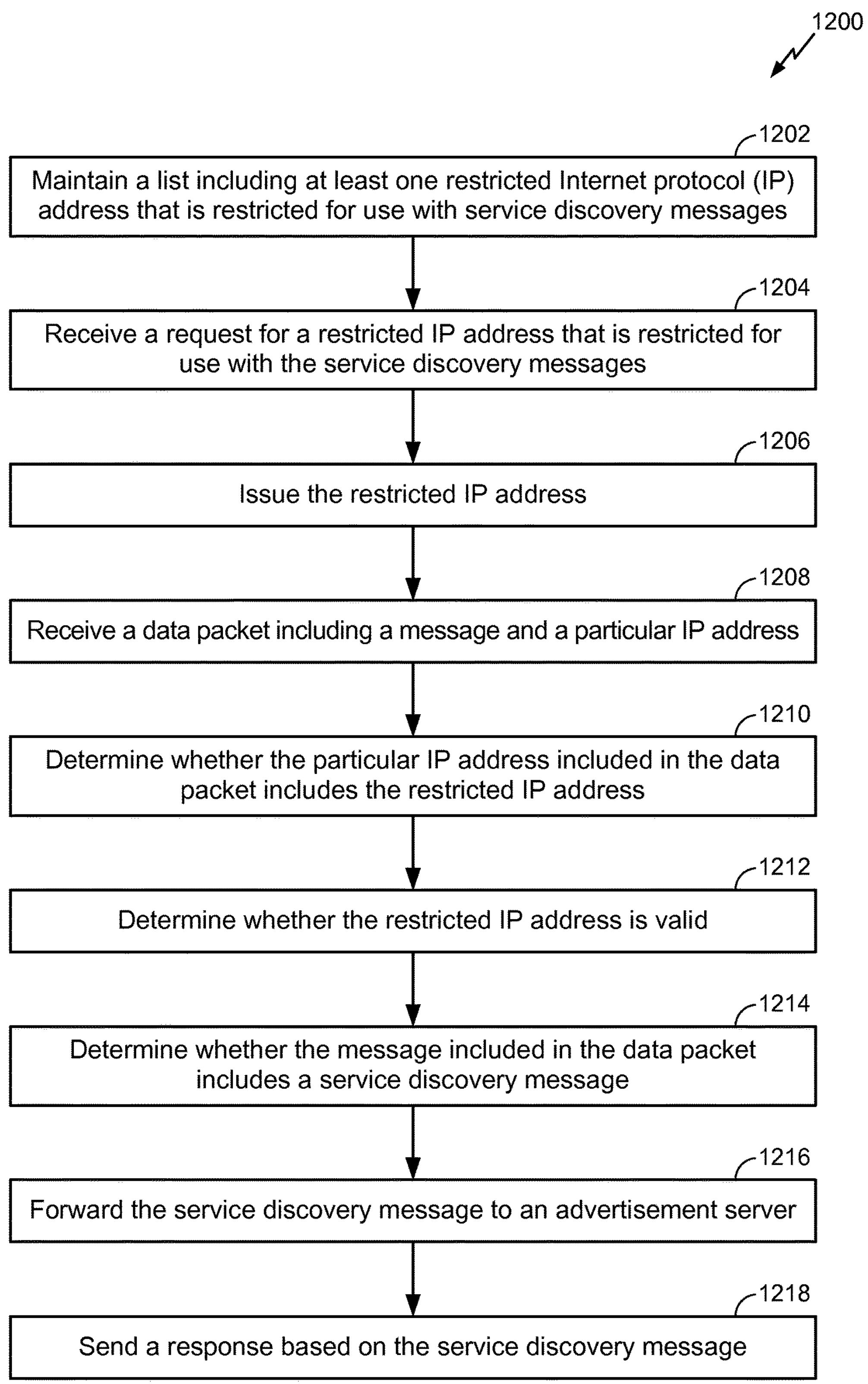
FIG. 12 is a flowchart to illustrate another particular embodiment of a method of communicating service discovery messages between a mobile station and an access point.

FIG. 12 is a flow diagram of an illustrative embodiment of a method 1200 of communicating service discovery messages. In a particular illustrative embodiment, the mobile station 1002 may include the mobile station 110 of FIG. 1 or the mobile station 1002 of FIG. 10. The access point 1004 may include the access point 130 or the information server 160 of FIG. 1, the system 900 of FIG. 9, the access point 1004 of FIG. 10, or a combination thereof.

The method 1200 may include maintaining a list that includes at least one restricted Internet protocol (IP) address that is restricted for use with service discovery messages (e.g., during a service discovery procedure), at 1202. For example, the access point 130 may maintain the IP addresses 140 of FIG. 1 or the list of IP addresses 922 of FIG. 9. The method 1200 may further include receiving a request for a restricted IP address that is restricted for use with the service discovery messages, at 1204, and issuing the restricted IP address, at 1206. In a particular embodiment, the access point may issue the restricted IP address to the mobile station after determining that the mobile station has not excessively requested such a restricted IP address (e.g., if a number of times the mobile station has requested a restricted IP address satisfies (e.g., is less than) a threshold). In a particular embodiment, the threshold may be a number of times the mobile station made such a request within a particular time period. After the access point issues the restricted IP address, the access point may update the list of IP addresses to reflect issuance of the restricted IP address to the mobile station. In another particular embodiment, the access point may issue the restricted IP address after determining that the mobile station has not excessively requested association without authentication with the access point (e.g., if a number of times the mobile station has requested association without authentication satisfies (e.g., is less than) a threshold).

The method 1200 may include receiving a data packet that includes a message and a particular IP address, at 1208, and determining whether the particular IP address included in the data packet includes the restricted IP address, at 1210. The service discovery message may include a layer 3 protocol message. For example, the processor 132 or data packet filter(s) 146 of FIG. 1 or the MAC address filter 912 of FIG. 9 may determine whether the source IP address of the data packet is the previously allocated restricted IP address.

The method 1200 may determine whether the restricted IP address is valid, at 1212, and whether the message included in the data packet includes a service discovery message, at 1214. When it is determined that the IP address is valid and the data packet includes a service discovery message, the method 1200 may include forwarding the service discovery message to an advertisement server, at 1216, and sending a response based on the service discovery message, at 1218. For example, the access point 130 may forward the service discovery message to one of the information server 160 and the network devices 170 and 172 of FIG. 1.

Figure 13:
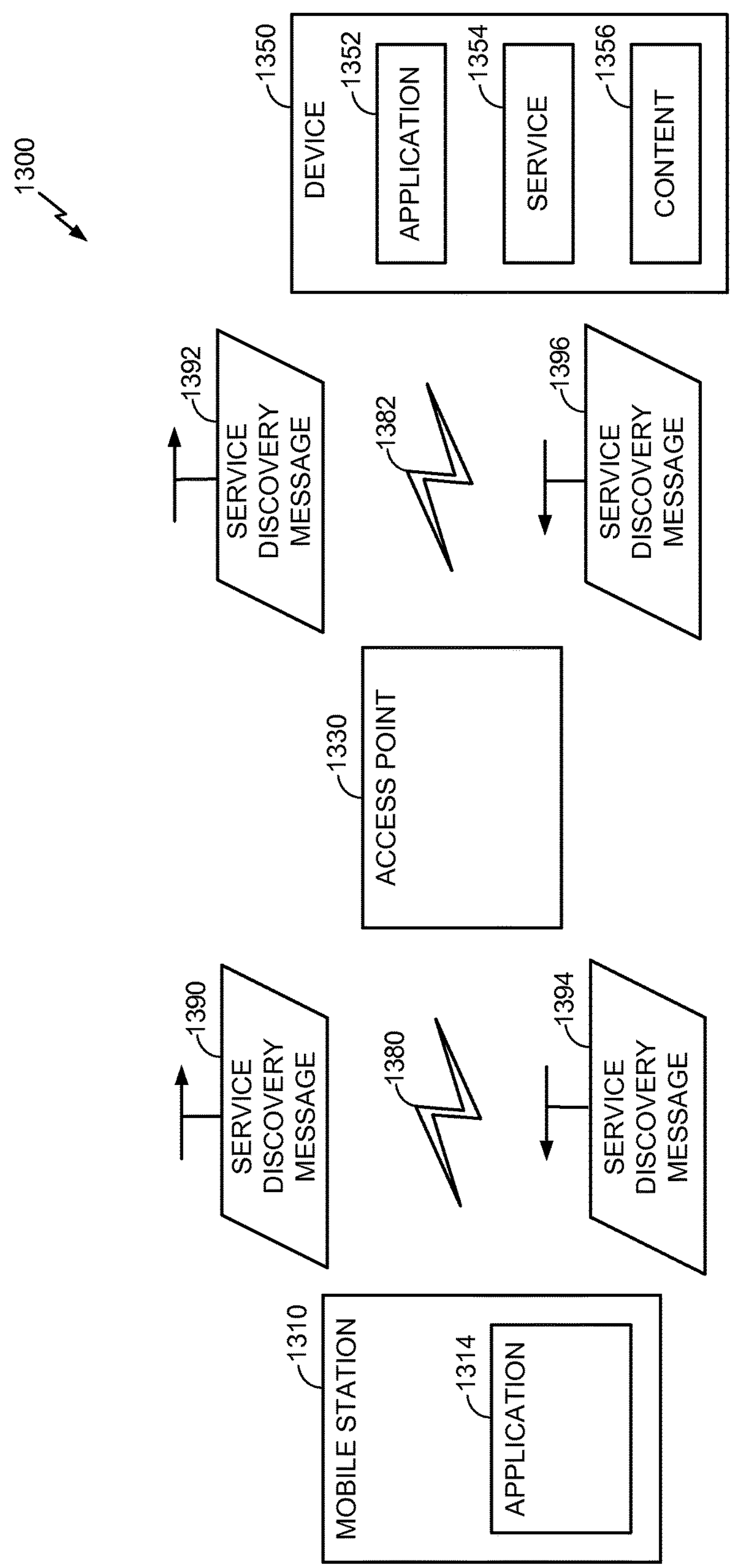
FIG. 13 is a diagram of another particular embodiment of a system that is operable to communicate service discovery messages to and from a mobile station.

Referring to FIG. 13, a particular illustrative embodiment of a system 1300 is shown. The system 1300 may include a mobile station 1310, an access point 1330, and a device 1350. For example, the mobile station 1310 and the access point 1330 may include the mobile station 110 and the access point 130 of FIG. 1, respectively. The system 1300 may be configured to construct, format, and/or communicate infrastructure service discovery messages (e.g., service discovery messages). For example, the system 1300 may enable the mobile station 1310 to use layer 3 protocols for service discovery prior to the mobile station 1310 being fully authenticated with and/or assigned an IP address by the access point 1330.

The mobile station 1310 may include an application 1314. The application 1314 may include software (e.g., a program), hardware, or a combination thereof. The mobile station 1310 may perform service discovery based on or in response to the application 1314. The application 1314 may initiate generation of one or more service discovery messages to search for one or more applications, services, or content. For example, the mobile station 1310 may search for one or more devices to provide a particular data file, such as a particular audio file by a particular artist. In a particular embodiment, the application 1314 initiates generation of a service discovery messages in response to a user input received at the mobile station 1310.

The mobile station 1310 may generate one or more service discovery messages (e.g., using a layer 3 protocol) and transmit the one or more service discovery messages to the access point 1330 to perform the service discovery as discussed with reference one or more of the methods of FIGS. 2-4, 7, 8, and 10-12. For example, the mobile station 1310 may transmit a first service discovery message 1390 via the wireless communication path 1380 to the access point 1330.

The access point 1330 may be coupled to the device 1350 via a wired connection, a wireless connection, or a combination thereof. In a particular embodiment, the access point 1330 is wireless coupled to the device 1350 via a wireless communication path 1382. The access point 1330 may be coupled to one or more additional devices (not shown). For example, the access point 1330 may be coupled to the other additional devices via a network, such as the network 180 of FIG. 1.

The access point 1330 may be configured to receive the first service discovery message 1390 via the wireless communication path 1380. The access point 1330 may process the first service discovery message 1390 and provide a response to the mobile station 1310 using a second service discovery message 1394 that is transmitted via the wireless communication path 1380. The access point 1330 may respond to the first service discovery message 1390 with or without forwarding at least a portion of the first service discovery message 1390 to the device 1350 as a third service discover message 1392. For example, the access point 1330 may respond to the first service discovery message 1390 if the access point 1330 includes information responsive to the first service discovery message 1390. The access point 1330 may forward (e.g., route) the service discover message 1390, or a portion thereof, via the wireless communication path 1382 to the device 1350 as the third service discovery message 1392. Additionally or alternatively, the access point 1330 may provide the third service discovery message 1392, or a portion thereof, to a GAS server (not shown), such as the information server 160 of FIG. 1.

The device 1350 may be wireless coupled to the access point 1330. For example, the device 1350 may be coupled to the access point 1350 via the wireless communication path 1382 after the device 1350 completes an authentication procedure (e.g., an association procedure) with the access point 1330. The authentication procedure may include a handshake procedure, and Internet protocol (IP) connectivity may be established between the device 1350 and the access point 1330 after completion of the authentication procedure. The device 1350 may have provided information (e.g., registered one or more capabilities of the device 1350, such as an application 1352, a service 1354, and/or content 1356 included in the device 1350) to the access point 1330. The device 1350 may have provided the information to the access point 1330 before, after, or during the authentication procedure. Additionally or alternatively, the device 1350 may provide the information to the GAS server (not shown), such as the information server 160 of FIG. 1.

The device 1350 may include the application 1352, the service 1354, and/or the content 1356. For example, the device 1350 may include one of the information server 160, the first network device 170, the second network device 172, as in FIG. 1, or other device, such as a wireless communication device. The device 1350 may be configured to receive the third service discovery message 1392 and to generate a response that is responsive to the service discovery message. The response may indicate whether the device 1350 includes or is configured to provide one or more of the application 1352, the service 1354, or the content 1356. For example, response may indicate that the device 1350 includes the particular data file (e.g., the particular audio file by the particular artist) that the mobile station 1310 is searching for. The device 1350 may generate and transmit the response via the wireless communication path 1382 as a fourth service discovery message 1396. The access point 1330 may receive the fourth service discovery message 1396 and forward the fourth service discovery message 1396, or a portion thereof, to the mobile station 1310 via the wireless communication path 1380 as the second service discovery message 1394.

The mobile station 1310 may receive the second service discovery message 1394 that is responsive to the first service discovery message 1390 generated by the mobile station 1310. The mobile station 1310 may process the second service discovery message 1394 to determine whether the device 1350 may provide the one or more applications, services, or content that the mobile station 1310 is searching for. Where a determination is made by the mobile station 1310 that the device 1350 is configured to provide the one or more applications, services, or content, the mobile station 1310 may initiate an authentication procedure to establish Internet protocol (IP) connectivity between the mobile station 1310 and the access point 1330. For example, the application 1314 may initiate IP connectivity between the mobile station 1310 and the access point 1330. In a particular embodiment, the mobile station 1310 may attempt to establish a communication link (e.g., a wireless communication channel) directly with the device 1350 that supports communication of layer 3 protocol messages (or a protocol messages higher than a layer three protocol messages) between the mobile station 1310 and the device 1350. In a particular embodiment, the mobile station 1310 may establish a direct communication with the device 1350 using a direct link setup procedure.

Once a communication path is established between the mobile station 1310 and the device 1350, directly or via the access point 1330, the application 1314 of the mobile station 1310 may receive or use one or more applications (e.g., the application 1352), services (e.g., the service 1354), or content (e.g., the content 1356) from the device 1350. For example, the mobile station 1310 may receive the particular data file (e.g., the particular audio file by the particular artist) that the mobile station 1310 searched for using the first service discovery message 1390.

The system 1300 of FIG. 13 may thus enable a mobile station to use layer 3 protocols for service discovery before the mobile station is fully authenticated and/or assigned an IP address. Further, the system 1300 of FIG. 13 may enable a device (e.g., the device 1350) to proactively provide information to an access point (e.g., the access point 1330) and/or a GAS server regarding applications, services, and/or content being made available by the device. Accordingly, the mobile station may identify a device that includes or provides one or more applications, service, or content sought by the mobile station.

It should be noted that the methods of FIGS. 2-4, 7, 8, and 10-12 may be implemented by a field-programmable gate array (FPGA) device, an application-specific integrated circuit (ASIC), a processing unit such as a central processing unit (CPU), a digital signal processor (DSP), a controller, another hardware device, a firmware device, or any combination thereof. As an example, the methods of FIGS. 2-4, 7, 8, and 10-12 can be performed by one or more processors that execute instructions, as further described with reference to FIG. 14.

Figure 14:
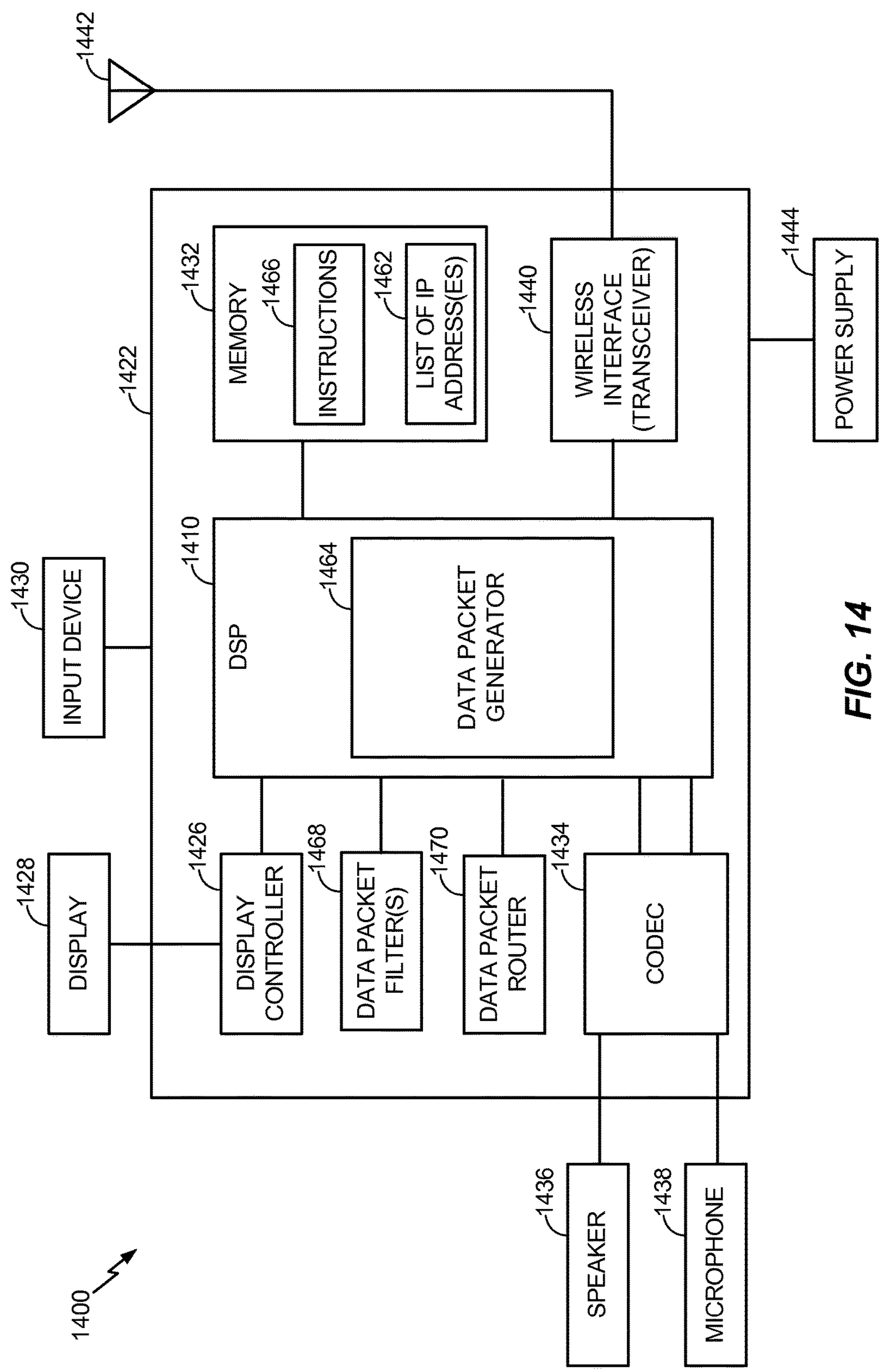
FIG. 14 is a block diagram of a portable device configured for infrastructure service discovery.

Referring to FIG. 14, a block diagram of a particular illustrative embodiment of a wireless communication device is depicted and generally designated 1400. For example, the device 1400 may include the mobile station 110, the access point, the information server 160, the first network device 170, or the second network device 172 of FIG. 1, the mobile station 202, the access point 204, or the network device 206 of FIG. 2, the mobile device 510, the access point 530, or the advertisement server 560 of FIG. 5, the system 900 of FIG. 9, the mobile station 1002 or the access point 1004 of FIG. 10, the mobile station 1310, the access point 1330, or the device 1350 of FIG. 13. The device 1400 includes a processor, such as a digital signal processor (DSP) 1410, coupled to a memory 1432. The DSP 1410 may include a data packet generator 1464. For example, when the device 1400 is a mobile station, the DSP 1410 may include the processor 112 of FIG. 1 and the data packet generator 1464 may include the data packet module 114 of FIG. 1.

As an illustrative embodiment, the wireless communication device 1400, or components thereof, may include, implement, or be included within a device selected from a group including of a mobile station, an access point, a GAS server, an advertisement server, a set top box, an entertainment unit, a navigation device, a communications device, a personal digital assistant (PDA), a fixed location data unit, a mobile location data unit, a mobile phone, a cellular phone, a computer, a portable computer, a desktop computer, a tablet, a monitor, a computer monitor, a television, a tuner, a radio, a satellite radio, a music player, a digital music player, a portable music player, a video player, a digital video player, a digital video disc (DVD) player, and a portable digital video player, each of which may be configured to execute one or more of the methods of FIGS. 2-4, 7, 8, and 10-12. As another illustrative, non-limiting example, the wireless communication device 1400 may include remote units such as mobile phones, hand-held personal communication systems (PCS) units, portable data units such as personal data assistants, global positioning system (GPS) enabled devices, navigation devices, fixed location data units such as meter reading equipment, or any other device that stores or retrieves data or computer instructions, or any combination thereof. Embodiments of the disclosure may be suitably employed in any device which includes active integrated circuitry including memory and on-chip circuitry.

In a particular embodiment, the memory 1432 includes instructions 1466 and a list of IP address(es) 1462. For example, the list of IP address(es) 1462 may include the Internet protocol address 120 or the Internet protocol addresses 140 of FIG. 1, or the list of IP addresses 922 of FIG. 9. The instructions 1466 may include computer-readable instructions or processor-readable instructions. The instructions 1466 may include one or more instructions that are executable by a computer such as the DSP 1410. For example, the instructions 1466 may include the instructions 118 or the instructions 138 of FIG. 1, instructions executable to perform one or more of the methods of FIGS. 2-4, 7, 8, and 10-12, or any combination thereof.

FIG. 14 also shows a display controller 1426 that is coupled to the digital signal processor 1410 and to a display 1428. A coder/decoder (CODEC) 1434 can also be coupled to the digital signal processor 1410. A speaker 1436 and a microphone 1438 can be coupled to the CODEC 1434.

FIG. 14 also indicates that a wireless interface 1440 (e.g. a transceiver) can be coupled to the digital signal processor 1410 and to an antenna 1442. For example, the wireless interface 1440 may include the wireless interface 122 or the wireless interface 148 of FIG. 1. In a particular embodiment, the DSP 1410, the display controller 1426, the memory 1432, the CODEC 1434, and the wireless interface 1440 (e.g., a wireless controller) are included in a system-in-package or system-on-chip device 1422. In a particular embodiment, an input device 1430 and a power supply 1444 are coupled to the system-on-chip device 1422. Moreover, in a particular embodiment, as illustrated in FIG. 14, the display 1428, the input device 1430, the speaker 1436, the microphone 1438, the antenna 1442, and the power supply 1444 are external to the system-on-chip device 1422. However, each of the display 1428, the input device 1430, the speaker 1436, the microphone 1438, the antenna 1442, and the power supply 1444 can be coupled to a component of the system-on-chip device 1422, such as an interface or a controller.

FIG. 14 also indicates that a data packet filter(s) 1468 and a data packet router 1470 can be coupled to the digital signal processor 1410. For example, the data packet filter(s) 1468 may include the data packet filter(s) 146 of FIG. 1, or the MAC address filter 912, the SAP 914, or the service discovery SAP 916 of FIG. 9. As another example, the data packet router 1470 may include the data packet router 144 of FIG. 1 or the data packet router 538 of FIG. 5. In a particular embodiment, the data packet filter(s) 1468 is functionally disposed between the digital signal processor 1410 and the wireless interface 1340.

In an exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to generate a data link layer query and generate a network layer query associated with a service discovery request. The instructions are further executable to cause the DSP 1410 to encapsulate the network layer query in the data link layer query to generate a modified data link layer query. The instructions are further executable to cause the DSP 1410 to send the modified data link layer query via a wireless network.

In another exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to extract from a data link layer query a network layer query included in the data link layer query. The network layer query is associated with a service discovery request. The instructions are further executable to cause the DSP 1410 to encapsulate a network layer response in a data link layer response to generate a modified data link layer response, where the network layer response is responsive to the network layer query.

In another exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to generate a service query message. The instructions are further executable to cause the DSP 1410 to send the service query message to an advertisement server via an uncontrolled port.

In another exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to route the service query message to an advertisement server via an uncontrolled port.

In another exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to request, from an access point, for association without authentication and for a restricted Internet protocol address. The restricted Internet protocol address is restricted for use in a service discovery procedure.

In another exemplary embodiment, the DSP 1410 may be configured to execute processor-executable instructions (e.g., computer executable instructions) stored at a non-transitory computer-readable medium, such as the memory 1432, that are executable to cause a computer, such as the DSP 1410, to receive a request for association without authentication and for a restricted Internet protocol (IP) address that is restricted for use in a service discovery procedure.

In conjunction with one or more of the described embodiments, an apparatus is disclosed that may include means for generating a data link layer query. The means for generating the data link layer query may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to generate a data link layer query, or any combination thereof.

The apparatus may also include means for generating a network layer query associated with a service discovery request. The means for generating a network layer query may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to generate a network layer query, or any combination thereof.

The apparatus may also include means for encapsulating the network layer query in the data link layer query to generate a modified data link layer query. The means for encapsulating may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to encapsulate a network layer query in a data link layer query, or any combination thereof.

The apparatus may also include means for sending the modified data link layer query via a wireless network. The means for sending may include the wireless interface 122, the transceiver 124, the wireless interface 148, the transceiver 150 of FIG. 1, the wireless interface 1440, the antenna 1442 of FIG. 14, one or more other devices or circuits configured to send a modified data link layer query, or any combination thereof.

In conjunction with one or more of the described embodiments, another apparatus is disclosed that may include means for extracting a network layer query included in a data link layer query from the data link layer query. The network layer query is associated with a service discovery request. The means for extracting may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to extract a network layer query included in a data link layer query from the data link layer query, or any combination thereof.

The apparatus may also include means for encapsulating a network layer response in a data link layer response to generate a modified data link layer response. The network layer response is responsive to the network layer query. The means for encapsulating may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to encapsulate a network layer response in a data link layer response, or any combination thereof.

In conjunction with one or more of the described embodiments, another apparatus is disclosed that may include means for generating a service query message. The means for generating may include the processor 112, the data packet module 114, the processor 132, the data packet module 134 of FIG. 1, the application 1314 of FIG. 13, the DSP 1410, the data packet generator 1464 of FIG. 14, one or more other devices or circuits configured to generate a service query message, or any combination thereof.

The apparatus may also include means for sending the service query message to an advertisement server via an uncontrolled port. The means for sending may include the wireless interface 122, the transceiver 124, the wireless interface 148, the transceiver 150 of FIG. 1, the wireless interface 1440, the antenna 1442 of FIG. 14, one or more other devices or circuits configured to send the service query message, or any combination thereof.

In conjunction with one or more of the described embodiments, another apparatus is disclosed that may include means for receiving a service query message. The means for receiving may include the wireless interface 122, the transceiver 124, the wireless interface 148, the transceiver 150 of FIG. 1, the wireless interface 1440, the antenna 1442 of FIG. 14, one or more other devices or circuits configured to receive a service query message, or any combination thereof.

The apparatus may also include means for routing the service query message to an advertisement server via an uncontrolled port. The means for routing may include the processor 132, the data packet router 144 of FIG. 1, the data packet router 538 of FIG. 5, the DSP 1410, the data packet router 1470 of FIG. 14, one or more other devices or circuits configured to route a service query message, or any combination thereof.

In conjunction with one or more of the described embodiments, another apparatus is disclosed that may include means for requesting, from an access point, association without authentication and a restricted Internet protocol (IP)

address, where the restricted IP address is restricted for use in a service discovery procedure. The means for requesting may include the processor 112, the processor 132 of FIG. 1, the application 1314 of FIG. 13, the DSP of FIG. 14, one or more other devices or circuits configured to request, from an access point, association without authentication and a restricted Internet protocol (IP) address, where the restricted IP address is restricted for use in a service discovery procedure, or any combination thereof.

The apparatus may also include means for receiving the restricted IP address. The means for receiving may include the wireless interface 122, the transceiver 124, the wireless interface 148, the transceiver 150 of FIG. 1, the wireless interface 1440, the antenna 1442 of FIG. 14, one or more other devices or circuits configured to receive the restricted IP address, or any combination thereof.

In conjunction with one or more of the described embodiments, another apparatus is disclosed that may include means for maintaining a list at a memory, where the list includes a restricted Internet protocol (IP) address that is restricted for use in a service discovery procedure. The means for maintaining may include the processor 112, the memory 116, the internet protocol address 120, the processor 132, the memory 136, the internet protocol addresses 140 of FIG. 1, the memory 920, the list of IP addresses 922 of FIG. 9, the memory 1432, the list of IP address(es) 1462 of FIG. 14, one or more other devices or circuits configured to maintain a list, or any combination thereof.

The apparatus may also include means for receiving a request for association without authentication and for the restricted IP address. The means for receiving may include the wireless interface 122, the transceiver 124, the wireless interface 148, the transceiver 150 of FIG. 1, the wireless interface 1440, the antenna 1442 of FIG. 14, one or more other devices or circuits configured to receiving a request for association without authentication and for a restricted IP address, or any combination thereof.

Those of skill would further appreciate that the various illustrative logical blocks, configurations, modules, circuits, and algorithm steps described in connection with the embodiments disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:

requesting, from an access point, association without authentication and a restricted Internet protocol (IP) address, wherein the restricted IP address is restricted for use in a service discovery procedure; and after receiving a service discovery response, transmitting, from a mobile station, an authentication request using the restricted IP address to enable IP connectivity with the access point.

2. The method of claim 1, wherein the restricted IP address is one of a plurality of restricted IP addresses.

3. The method of claim 1, further comprising determining whether the access point issues the restricted IP address.

4. The method of claim 1, wherein the restricted IP address enables a mobile station to communicate a layer 3 protocol message with the access point, wherein the layer 3 protocol message is limited to a discovery protocol message.

5. The method of claim 1, further comprising:

receiving, from the access point, the restricted IP address;

generating a service discovery message;

sending the service discovery message using the restricted IP address; and receiving a response based on the service discovery message.

6. The method of claim 5, wherein the restricted IP address is valid during a period of time.

7. The method of claim 5, wherein the restricted IP address enables a limited number of messages to be sent using the restricted IP address.

8. The method of claim 5, further comprising requesting the access point to converting the restricted IP address to an authenticated IP address, wherein the authenticated IP address indicates that a mobile station is in an authenticated state with respect to the access point.

9. An apparatus comprising:

a processor; and a memory coupled to the processor, wherein the memory stores instructions executable by the processor to:

request, from an access point, association without authentication and a restricted Internet protocol (IP) address, wherein the restricted IP address is restricted for use in a service discovery procedure; and after receiving a service discovery response, transmit an authentication request using the restricted IP address to enable IP connectivity with the access point.

10. The apparatus of claim 9, wherein the service discovery procedure includes a transmission of a service discovery message.

11. The apparatus of claim 9, wherein the instructions are further executable by the processor to receive one of a beacon and a probe response and wherein the one of the beacon and the probe response includes information indicating whether the access point issues the restricted IP address.

12. A non-transitory processor-readable medium comprising instructions that, when executed by a processor, cause the processor to:

receive, from a mobile station, a request for association without authentication and for a restricted Internet protocol (IP) address that is restricted for use in a service discovery procedure; and receive, from the mobile station, an authentication request associated with the restricted IP address to enable IP connectivity.

13. The non-transitory processor-readable medium of claim 12, wherein the instructions are further executable by the processor to maintain a list including a plurality of restricted IP addresses, wherein each restricted IP address of the plurality of the restricted IP addresses is restricted for use in the service discovery procedure.

14. The non-transitory processor-readable medium of claim 12, wherein the instructions are further executable by the processor to transmit a beacon, wherein the beacon indicates that an access point is configured to provide the association without authentication and the restricted IP address.

15. The non-transitory processor-readable medium of claim 12, wherein the service discovery procedure includes a transmission of a service discovery packet.

16. The non-transitory processor-readable medium of claim 12, wherein the instructions are further executable by the processor to:

determine a number of times that the mobile station previously requested association without authentication;

deny the request for association without authentication when the number of times satisfies a threshold; and issue the restricted IP address when the number of times does not satisfy the threshold.

17. The non-transitory processor-readable medium of claim 12, wherein the instructions are further executable by the processor to:

receive a data packet;

determine whether the data packet includes a particular IP address;

when the data packet includes the particular IP address, determine whether the particular IP address includes the restricted IP address; and when the particular IP address includes the restricted IP address, determine whether the restricted IP address is valid.

18. The non-transitory processor-readable medium of claim 12, wherein the instructions are further executable by the processor to:

forward a data packet to a first filter, wherein the first filter determines:

whether the data packet includes a particular IP address;

whether the particular IP address includes the restricted IP address; and whether the restricted IP address is valid;

forward the data packet from the first filter to a second filter when the data packet includes the restricted IP address and the restricted IP address is valid, wherein the second filter determines whether the data packet was constructed based on a service discovery protocol; and forward the data packet from the second filter upon determining that the data packet was constructed based on the service discovery protocol.

19. The non-transitory processor-readable medium of claim 18, wherein the first filter includes a layer 2 filter, wherein the second filter includes a service discovery service access point (SAP), and wherein the data packet is forwarded from the service discovery service access point to a layer 3 component.

20. The non-transitory processor-readable medium of claim 18, wherein the first filter is a media access control (MAC) address filter.

* * * * *